US012651774B2

(12) United States Patent
Honda

(10) Patent No.: US 12,651,774 B2
(45) Date of Patent: Jun. 9, 2026

(54) NON-AQUEOUS ELECTROLYTE SECONDARY BATTERY AND METHOD FOR PRODUCING SAME

(71) Applicants: Mitsubishi Chemical Corporation, Tokyo (JP); MU IONIC SOLUTIONS CORPORATION, Tokyo (JP)

(72) Inventor: Tatsuhiko Honda, Tokyo (JP)

(73) Assignees: Mitsubishi Chemical Corporation, Tokyo (JP); MU IONIC SOLUTIONS CORPORATION, Tokyo (JP)

( * ) Notice: Subject to any disclaimer, the term of this patent is extended or adjusted under 35 U.S.C. 154(b) by 885 days.

(21) Appl. No.: 17/873,530

(22) Filed: Jul. 26, 2022

(65) Prior Publication Data

US 2022/0359913 A1 Nov. 10, 2022

Related U.S. Application Data

(63) Continuation of application No. PCT/JP2021/003242, filed on Jan. 29, 2021.

(30) Foreign Application Priority Data

Jan. 31, 2020 (JP) ................................ 2020-015268

(51) Int. Cl.

| | |
|---|---|
| ***H01M 10/0568*** | (2010.01) |
| ***H01M 4/02*** | (2006.01) |
| ***H01M 4/04*** | (2006.01) |
| ***H01M 4/505*** | (2010.01) |
| ***H01M 4/525*** | (2010.01) |
| ***H01M 10/0525*** | (2010.01) |

(52) U.S. Cl.

CPC ..... *H01M 10/0568* (2013.01); *H01M 4/0404* (2013.01); *H01M 4/505* (2013.01); *H01M 4/525* (2013.01); *H01M 10/0525* (2013.01); *H01M 2004/028* (2013.01); *H01M 2300/0028* (2013.01)

(58) Field of Classification Search

None

See application file for complete search history.

(56) References Cited

U.S. PATENT DOCUMENTS

| | | | |
|---|---|---|---|
| 2012/0141869 A1 | 6/2012 | Takahata | |
| 2012/0308881 A1 | 12/2012 | Tokuda et al. | |
| 2017/0149088 A1 | 5/2017 | Ueno et al. | |
| 2017/0214089 A1* | 7/2017 | Jimenez ............ | H01M 10/0525 |
| 2018/0048021 A1* | 2/2018 | Hiramoto ................ | H01M 4/36 |
| 2018/0375158 A1 | 12/2018 | Morinaka et al. | |
| 2019/0013543 A1 | 1/2019 | Tao et al. | |
| 2019/0081355 A1* | 3/2019 | Nakayama ............ | H01M 4/505 |
| 2019/0181455 A1 | 6/2019 | Ishii et al. | |
| 2019/0372176 A1 | 12/2019 | Kato et al. | |
| 2019/0393556 A1 | 12/2019 | Matsuoka et al. | |
| 2021/0005933 A1 | 1/2021 | Kinoshita et al. | |
| 2021/0075006 A1 | 3/2021 | Nakayama | |
| 2021/0075060 A1 | 3/2021 | Nakayama | |

FOREIGN PATENT DOCUMENTS

| | | | |
|---|---|---|---|
| CN | 102549831 | A | 7/2012 |
| CN | 106537654 | A | 3/2017 |
| CN | 106797021 | A | 5/2017 |
| CN | 107706357 | A | 2/2018 |
| CN | 109494403 | A | 3/2019 |
| EP | 3 396 771 | A1 | 10/2018 |
| EP | 3 454 396 | A1 | 3/2019 |
| EP | 3 678 250 | A1 | 7/2020 |
| EP | 3 709 427 | A1 | 9/2020 |
| JP | 2016-184462 | A | 10/2016 |
| JP | 2019-50153 | A | 3/2019 |
| JP | 2019-102434 | A | 6/2019 |
| JP | 2019-212419 | A | 12/2019 |
| JP | 2021-44138 | A | 3/2021 |
| JP | 2021-44139 | A | 3/2021 |
| KR | 10-2014-0007000 | A | 1/2014 |
| KR | 10-2019-0069319 | A | 6/2019 |
| TW | 201840052 | A | 11/2018 |
| WO | WO 2017/111143 | A1 | 6/2017 |
| WO | WO 2019/054418 | A1 | 3/2019 |

OTHER PUBLICATIONS

Indian Office Action issued on Nov. 29, 2022 in Indian Patent Application No. 202247047903, 6 pages.

Combined Chinese Office Action and Search Report issued Mar. 29, 2025, in corresponding Chinese Patent Application No. 202180011832.1 (with English Translation of Category of Cited Documents), 18 pages.

Japanese Office Action issued Oct. 8, 2024 in Japanese Application 2021-574151, (with unedited computer-generated English translation), 8 pages.

Indonesian Office Action issued Oct. 19, 2023 in Indonesian Patent Application No. P00202209294 (with English translation), 6 pages.

Extended European Search Report issued Jun. 17, 2024 in European Application No. 21747733.0, 8 pgs.

Korean Office Action dated Nov. 26, 2024 in Korean Patent Application No. 10-2022-7028134 with English Machine Translation, 12 pgs.

(Continued)

*Primary Examiner* — Ula C Ruddock

*Assistant Examiner* — Maria F Orozco

(74) *Attorney, Agent, or Firm* — Oblon, McClelland, Maier & Neustadt, L.L.P.

(57) ABSTRACT

An object of the present invention is to provide a non-aqueous electrolytic solution secondary battery capable of improving low-temperature output characteristics.

The problem is solved by a secondary battery including a non-aqueous electrolytic solution containing fluorosulfonic acid ions, difluorophosphate ions, and bisoxalate borate ions, in which $[FSO_3^-]>[PO_2F_2^-]>[BOB^-]$ is satisfied in the non-aqueous electrolytic solution.

7 Claims, No Drawings

(56) References Cited

OTHER PUBLICATIONS

International Search Report issued Mar. 23, 2021 in PCT/JP2021/003242, 2 pages.

International Preliminary Report on Patentability and Written Opinion issued Jul. 28, 2022 in PCT/JP2021/003242 (submitting English translation only), 4 pages.

Office Action dated Jan. 20, 2026, in Chines Patent Application 202180011832.1 with machine generated English translation, citing documents 3 and 4, (24 pages).

* cited by examiner

NON-AQUEOUS ELECTROLYTE SECONDARY BATTERY AND METHOD FOR PRODUCING SAME

CROSS REFERENCE TO RELATED APPLICATIONS

This application is a Continuation of PCT International Application No. PCT/JP2021/003242, filed on Jan. 29, 2021, which is claiming priority of Japanese Patent Application No. 2020-015268, filed on Jan. 31, 2020, the entire contents of which are incorporated herein by reference.

TECHNICAL FIELD

The present invention relates to a non-aqueous electrolytic solution and an energy devise using the same.

BACKGROUND ART

Energy devices using a non-aqueous electrolytic solution such as non-aqueous electrolytic solution secondary batteries, electric double-layer capacitors, and lithium-ion capacitors, have been put to practical use in a wide range of applications, from so-called consumer power sources for cell phones, laptop computers, and the like, to automotive power sources for driving automobiles, large power sources for stationary applications, and the like. However, recent demands for higher performance in energy devices have been ever increasing, and particularly in non-aqueous electrolytic solution rechargeable batteries, it is demanded to achieve high levels of battery characteristics, such as capacity, input/output and charge/discharge rate characteristics, and safety.

In particular, when lithium secondary batteries are used as power sources for electric vehicles, since electric vehicles need a large amount of energy when starting and accelerating, and large energy generated during deceleration needs to be regenerated efficiently, high output characteristics and input characteristics are demanded for lithium secondary batteries. Since electric vehicles are used outdoors, in order for electric vehicles to start and accelerate quickly even in cold weather, high input/output characteristics at low temperature such as −20° C. (low battery internal impedance) are demanded for lithium secondary batteries, in particular.

As a means to improve the initial characteristics of non-aqueous electrolytic solution secondary batteries, a number of techniques have been studied for a variety of battery components, including an active material for a positive electrode or a negative electrode, as well as a non-aqueous electrolytic solution. In order to improve a low-temperature performance of a non-aqueous electrolytic solution secondary battery, a technique of adding lithium fluorosulfonate ($FSO_3Li$) to a non-aqueous electrolytic solution is known (for example, Patent Document 1).

Patent document 2 discloses a technique for providing a non-aqueous electrolytic solution secondary battery and the like having excellent input/output characteristics by using a non-aqueous electrolytic solution containing lithium difluorophosphate ($LiPO_2F_2$) and lithium bisoxalate borate (LiBOB), and further, a salt with an F—S bond in the molecule.

PRIOR ART DOCUMENTS

Patent Documents

Patent Document1 Japanese Unexamined Patent Application Publication No. 2019-50153

Patent Document2 Japanese Unexamined Patent Application Publication No. 2016-184462

SUMMARY OF THE INVENTION

Problems to be Solved by the Invention

As described above, with the increasing demand for higher performance non-aqueous electrolytic solution secondary batteries in recent years, further improvement of the performance of non-aqueous electrolytic solution secondary batteries, particularly in input/output characteristics at low temperature, is demanded.

On the other hand, particularly during the stage of initial charging after the battery assembly process, a coating film, which is called Solid Electrolyte Interphase (SEI), is formed on a negative electrode. This SEI is closely related to battery performance, such as battery capacity, output characteristics, durability, and the like, and it is generally known that a dense and uniform SEI is formed and battery performance is improved by lowering the initial charge current value, stopping charging in the middle of charging, allowing the battery to stand still, and the like.

However, as a result of intensive study by the present inventor, it has been found that in the case of non-aqueous electrolytic solution secondary batteries using the electrolytic solutions described in Patent Documents 1 to 2, when the aging temperature is not sufficiently high at the initial charging, discharging, aging, and inspection process (hereafter, also referred to as "battery break-in operation") after the battery assembly process, the output characteristics are insufficient under a low-temperature environment.

The above-described "charging, discharging, aging, and inspection process (battery break-in operation)" includes a part or a plurality of charging and discharging process, aging process, and shipping inspection process after a battery assembly process, which are universally and generally carried out in lithium ion battery manufacturing process (see, for example, "Onboard Lithium Secondary Battery Technology, Degradation and Trouble Factors, and Their Countermeasures" published by Technical Information Association, Aug. 5, 2011, First edition).

The present invention was made in view of such circumstances, and an object of the present invention is to provide a non-aqueous electrolytic solution secondary battery capable of improving low-temperature output characteristics.

Means for Solving the Problems

The present inventor examined such a phenomenon, and presumed that the reason for occurrence of such a phenomenon is as follows. In a battery using a non-aqueous electrolytic solution containing lithium bisoxalate borate and lithium difluorophosphate, when the aging temperature in an aging process after a battery assembly process is too low, an electrolytic solution reduction reaction on a surface of a negative electrode becomes uneven, resulting in a variation in the amount of coating film formed on the surface of the negative electrode, whereby areas with thick coating film and areas with thin coating film coexist on the surface of the negative electrode. When the above-described input/output test is carried out under such a condition, the battery output is reduced due to high resistance in areas with large amounts of coating film. On the other hand, when the aging temperature is sufficiently high, a reduction reaction of an electrolytic solution on a surface of a negative electrode occurs uniformly, and a uniform coating film is formed on the surface of the negative electrode, thereby improving the battery output.

Although Patent Document 1 and Patent Document 2 disclose techniques for providing a non-aqueous electrolytic solution secondary battery with excellent input/output characteristics by using a combination of lithium fluorosulfonate, lithium difluorophosphate, and lithium bisoxalate borate, these techniques were unable to prevent the above-described phenomenon of non-uniformity of the above-described negative electrode coating film, leaving room for further improvement of the characteristics.

Accordingly, the present inventors intensively studied to solve the above-described problems to find that the output characteristics of a non-aqueous electrolytic solution secondary battery under a low-temperature environment can be improved by using a non-aqueous electrolytic solution containing fluorosulfonic acid ions, difluorophosphate ions, and bisoxalate borate ions, wherein the content of fluorosulfonic acid ions, difluorophosphate ions, and bisoxalate borate ions in the non-aqueous electrolytic solution is within a specific range, thereby arriving at the present invention.

In other words, the present invention provides the specific aspects, and the like, shown in [1] to [7] below.

[1] A non-aqueous electrolytic solution secondary battery comprising a non-aqueous electrolytic solution containing fluorosulfonic acid ions, difluorophosphate ions, and bisoxalate borate ions, wherein the non-aqueous electrolytic solution is a non-aqueous electrolytic solution in which the concentration of fluorosulfonic acid ions $[FSO_3^-]$, the concentration of difluorophosphate ions $[PO_2F_2^-]$, and the concentration of bisoxalate borate ions $[BOB^-]$ in the non-aqueous electrolytic solution satisfy the following formula (1).

$$[FSO_3^-]>[PO_2F_2^-]>[BOB^-] \quad (1)$$

[2] The non-aqueous electrolytic solution secondary battery according to [1], wherein the non-aqueous electrolytic solution is a non-aqueous electrolytic solution that satisfies the following formula (2) and formula (3).

$$([FSO_3^-]+[PO_2F_2^-])/([PO_2F_2^-]+[BOB^-])>1.8 \quad (2)$$

$$[FSO_3^-]<1.3\% \text{ by mass} \quad (3)$$

[3] The non-aqueous electrolytic solution secondary battery according to [1] or [2], wherein the voltage change is 33 mV or more when the non-aqueous electrolytic solution secondary battery is stored for 24 hours at a voltage of 4.1 V and a high-temperature environment of 60° C. or higher.

[4] The non-aqueous electrolytic solution secondary battery according to any one of [1] to [3], wherein the non-aqueous electrolytic solution contains 1 ppm by mass or more and 100 ppm by mass or less of Al ions.

[5] The non-aqueous electrolytic solution secondary battery according to any one of [1] to [4], containing a negative electrode and a positive electrode capable of absorbing and releasing lithium ions.

[6] The non-aqueous electrolytic solution secondary battery according to [5], wherein the positive electrode includes a current collector and a positive electrode active material layer provided on the current collector, and the positive electrode active material layer contains at least one selected from the group consisting of lithium-cobalt composite oxide, lithium-cobalt-nickel composite oxide, lithium-manganese composite oxide, lithium-cobalt-manganese composite oxide, lithium-nickel composite oxide, lithium-nickel-manganese composite oxide, and lithium-cobalt-nickel-manganese composite oxide.

[7] A method of manufacturing a non-aqueous electrolytic solution secondary battery comprising a non-aqueous electrolytic solution containing fluorosulfonic acid ions, difluorophosphate ions, and bisoxalate borate ions, the method comprising:

a battery assembly process of assembling a non-aqueous electrolytic solution secondary battery using a non-aqueous electrolytic solution in which the concentration of fluorosulfonic acid ions $[FSO_3^-]$, the concentration of difluorophosphate ions $[PO_2F_2^-]$, and the concentration of bisoxalate borate ions $[BOB^-]$ in the non-aqueous electrolytic solution satisfy the following formula (1); and an aging process of aging the non-aqueous electrolytic solution secondary battery under a temperature environment in a range of 50° C. or more and 80° C. or less.

$$[FSO_3^-]>[PO_2F_2^-]>[BOB^-] \quad (1)$$

Effect of the Invention

By using the non-aqueous electrolytic solution specified in the present invention, it is possible to obtain a non-aqueous electrolytic solution secondary battery with improved low-temperature output characteristics, and it is also possible to manufacture the non-aqueous electrolytic solution secondary battery.

DETAILED DESCRIPTION OF THE INVENTION

Embodiments of the present invention are described in detail below. The following embodiment is one example (representative example) of embodiments of the present invention, and the present invention is not limited thereto. The present invention may be carried out with any modifications within the scope not deviating from the gist thereof.

<1. Non-Aqueous Electrolytic Solution>

A non-aqueous electrolytic solution used in a non-aqueous secondary battery according to one embodiment of the present invention contains fluorosulfonic acid ions ($FSO_3^-$), difluorophosphate ions ($PO_2F_2^-$), and bisoxalate borate ions ($BOB^-$), the content of which is within a specific range.

The non-aqueous electrolytic solution preferably contains 1 ppm by mass or more and 100 ppm by mass or less of Al ions. It is presumed that when specific amounts of Al ions, fluorosulfonic acid ions, difluorophosphate ions, bisoxalate borate ions are contained in a non-aqueous electrolytic solution, the charge preservation characteristics under high-temperature environments are improved by coordination or interaction of one or more kinds of $FSO_3^-$ (fluorosulfonic acid ions) or $PO_2F_2^-$(difluorophosphoric acid ions) or bisoxalate borate ions with Al ions, which increases the reduction resistance of Al ions and suppresses a negative electrode reduction reaction, and the like.

In the following, a non-aqueous electrolytic solution is described in detail.

<1-1. Components Contained in Non-Aqueous Electrolytic Solution>

<1-1-1. Fluorosulfonic Acid Ion ($FSO_3^-$)>

The non-aqueous electrolytic solution of the present embodiment contains $FSO_3^-$. Monovalent positive ions and divalent positive ions can be used as counter ions for fluorosulfonic acid ions. Lithium ion, sodium ion, and potassium ion are preferred as monovalent positive ions, and lithium ion is particularly preferred. Magnesium ion and calcium ion are preferred as divalent positive ions, and magnesium ion is particularly preferred. These can be used singly or in combination of two or more kinds thereof. In a particularly preferable embodiment, $FSO_3^-$ is contained in a non-aqueous electrolytic solution as lithium fluorosulfonate ($FSO_3Li$).

The content of $FSO_3^-$ is not particularly limited as long as the relationship described below in <1-2. Relationship between $FSO_3^-$, $PO_2F_2^-$, and $BOB^-$> is satisfied. The content of $FSO_3^-$ when using monovalent positive ions in a non-aqueous electrolytic solution is preferably 0.001% by mass or more, more preferably 0.01% by mass or more, and further preferably 0.10% by mass or more, and on the other hand, although the upper limit is not particularly restricted, preferably 10.0% by mass or less, more preferably 7.0% by mass or less, further preferably 5.0% by mass or less, especially preferably 4.0% by mass or less, and particularly preferably 3.0% by mass or less. The content of $FSO_3^-$ when using divalent positive ions in a non-aqueous electrolytic solution is preferably 0.002% by mass or more, more preferably 0.02% by mass or more, and further preferably 0.20% by mass or more, on the other hand, although the upper limit is not particularly restricted, and is preferably 20.0% by mass or less, more preferably 14.0% by mass or less, further preferably 10.0% by mass or less, particularly preferably 8.0% by mass or less, and particularly preferably 6.0% by mass or less. When using both monovalent positive ions and divalent positive ions as counter ions for fluorosulfonic acid ions, they should be prepared to be in the range of $FSO_3^-$ concentrations described above. As used herein, the content (% by mass) of $FSO_3^-$ in a non-aqueous electrolytic solution and the concentration of fluorosulfonic acid ions ($[FSO_3^-]$) in the non-aqueous electrolytic solution are synonymous.

When the content of $FSO_3^-$ is 10.0% by mass or less in the non-aqueous electrolytic solution, it is preferable in that negative electrode reduction reaction does not increase to the extent that the internal resistance of a non-aqueous electrolytic solution secondary battery increases, and when the content is 0.001% by mass or more, it is preferable in that an effect of the present application of containing $FSO_3^-$ is exerted. Accordingly, when the content is within the above-described range, the charge preservation characteristics under a high-temperature environment can be improved due to suppression of a negative electrode reduction reaction under a high-temperature environment, or the like.

$FSO_3^-$ may be synthesized and used by known methods, or a commercially available product may be used. The method of measuring the content of $FSO_3^-$ in the above-described non-aqueous electrolytic solution and non-aqueous electrolytic solution secondary battery is not particularly restricted, and any known method may be used. Specific examples include ion chromatography, and $^{19}F$ nuclear magnetic resonance spectroscopy (hereinafter, sometimes referred to as "NMR").

<1-1-2. Difluorophosphate Ion ($PO_2F_2^-$)>

The non-aqueous solution of the present embodiment contains $PO_2F_2^-$. As counter ions of difluorophosphate ions, monovalent positive ions and divalent positive ions can be used. As monovalent positive ions, lithium ion, sodium ion, and potassium ion are preferred, and lithium ion is particularly preferred. As divalent positive ions, magnesium ion and calcium ion are preferred, and magnesium ion is particularly preferred. These can be used singly or in combination of two or more kinds thereof. In a particularly preferred embodiment, $PO_2F_2^-$ is contained in a non-aqueous electrolytic solution as lithium difluorophosphate ($LiPO_2F_2$).

The content of $PO_2F_2^-$ is not particularly limited as long as the relationship described below in <1-2. Relationship between $FSO_3^-$, $PO_2F_2^-$, and BOB> is satisfied. Specifically, the lower limit of the content of $PO_2F_2^-$ when using monovalent positive ions, with respect to the total amount of non-aqueous electrolytic solution, is preferably 0.001% by mass or more, more preferably 0.010% by mass or more, and further preferably 0.10% by mass or more. The upper limit with respect to the total amount of non-aqueous electrolytic solution is preferably 1.3% by mass or less, 1.2% by mass or less, and further preferably 1.1% by mass or less. The lower limit of the content of $PO_2F_2^-$ when using divalent positive ions, with respect to the total amount of non-aqueous electrolytic solution, is preferably 0.002% by mass or more, more preferably 0.020% by mass or more, and further preferably 0.20% by mass or more. The upper limit value, with respect to the total amount of non-aqueous electrolytic solution, is preferably 2.6% by mass or less, more preferably 2.4% by mass or less, and further preferably 2.2% by mass or less. When both monovalent positive ions and divalent positive ions are used as counter ions for difluorophosphate ions, these ions may be prepared to be in the above-described $PO_2F_2^-$ concentration range. Herein, the content (% by mass) of $PO_2F_2^-$ in a non-aqueous electrolytic solution and the concentration of difluorophosphate ions ($[PO_2F_2^-]$) in the non-aqueous electrolytic solution are synonymous.

When the concentration of $PO_2F_2^-$ is within the above-described preferable range, an effect of improving initial output under a low-temperature environment is more easily exhibited.

Here, preparation of an electrolytic solution when $PO_2F_2^-$ is contained in the electrolytic solution may be performed by any known method, and is not particularly limited. Examples of preparation methods include a method in which $LiPO_2F_2$, synthesized by a known method separately, is added to an electrolytic solution, or a method in which water is left coexisting in battery components such as active materials and electrode plates, and $PO_2F_2^-$ is generated in a system when a battery is assembled using an electrolytic solution containing $LiPF_6$. Either method may be used in the present embodiment.

The method of measuring the content of $PO_2F_2^-$ in the above-described non-aqueous electrolytic solution and non-aqueous electrolytic solution secondary battery is not particularly restricted, and any known method can be used. Specific examples thereof include ion chromatography and $^{19}F$ NMR.

<1-1-3. Bisoxalate Borate Ion ($BOB^-$)>

The non-aqueous solution of the present embodiment contains bisoxalate borate ions ($BOB^-$). As counter ions of bisoxalate borate ions, monovalent positive ions and divalent positive ions can be used. As monovalent positive ions, lithium ions, sodium ions, and potassium ions are preferred, and lithium ions are particularly preferred. As divalent positive ions, magnesium and calcium ions are preferred, and magnesium ions are particularly preferred. These can be used singly or in combination of two or more kinds thereof. In a particularly preferred aspect, bisoxalate borate ions is contained in a non-aqueous electrolytic solution as lithium bisoxalate borate (LiBOB).

The content of $BOB^-$ is not particularly limited as long as the relationship described below in <1-2. Relationship between $FSO_3^-$, $PO_2F_2^-$, and $BOB^-$> is satisfied. Specifically, the lower limit of the content of $BOB^-$ when using monovalent positive ions, with respect to the total amount of non-aqueous electrolytic solution, is preferably 0.001% by mass or more, more preferably 0.01% by mass or more, and further preferably 0.10% by mass or more. The upper limit, with respect to the total amount of non-aqueous electrolytic solution, is preferably 2% by mass or less, 1% by mass or less, and further preferably 0.8% by mass or less. The lower limit of the content of $BOB^-$ when using divalent positive ions, with respect to the total amount of non-aqueous electrolytic solution, is preferably 0.002% by mass or more, more preferably 0.02% by mass or more, and further preferably 0.20% by mass or more. The upper limit value, with respect to the total amount of non-aqueous electrolytic solution, is preferably 4% by mass or less, more preferably 2% by mass or less, and further preferably 1.6% by mass or less. When both monovalent positive ions and divalent positive ions are used as counter ions for bisoxalate borate ions, these ions may be prepared to be in the above-described $BOB^-$ concentration range. Herein, the content (% by mass) of $BOB^-$ in a non-aqueous electrolytic solution and the concentration of bisoxalate borate ions ($[BOB^-]$) in the non-aqueous electrolytic solution are synonymous.

When the concentration of $BOB^-$ is within the above-described preferable range, an effect of improving battery durability, such as high-temperature preservation characteristics and cycle characteristics, is more easily exhibited.

$BOB^-$ may be synthesized and used by known methods, or a commercially available product may be used. Here, preparation of an electrolytic solution when $BOB^-$ is contained in the electrolytic solution may be performed by any known method, and is not particularly limited. Examples of preparation methods include a method in which LiBOB synthesized by a separately known method is added to an electrolytic solution. Either method may be used in the present embodiment. The method of measuring the content of $BOB^-$ in the above-described non-aqueous electrolytic solution and non-aqueous electrolytic solution secondary battery is not particularly restricted, and any known method can be used. Specific examples thereof include ion chromatography and $^{11}B$ NMR. The following describes the method of analyzing $BOB^-$ by ion chromatography. A non-aqueous electrolytic solution is collected in a volumetric flask and diluted to 50 mL with ultrapure water, and the amount of oxalic acid is measured by ion chromatograph (IC: Thermo Fishcer Scientific, ICS-2000). This is then converted to the amount of $BOB^-$ to determine the amount of $BOB^-$ in the non-aqueous electrolytic solution. The following describes the method of analysis by NMR. A non-aqueous electrolytic solution is diluted in heavy DMSO, $LiBF_4$ is added as a standard substance, and $^{19}F$ NMR and $^{11}B$ NMR measurements are performed. The integral ratio of $LiPF_6$ to $BOB^-$ is determined via the $LiBF_4$ peak, and the $BOB^-$ concentration can be calculated from the $LiPF_6$ concentration determined by ion chromatography.

<1-2. Relationship Between $FSO_3^-$, $PO_2F_2^-$, and $BOB^-$>

The concentrations of $FSO_3^-$ ($[FSO_3^-]$), $PO_2F_2^-$ ($[PO_2F_2^-]$), and $BOB^-$ ($[BOB^-]$) in the non-aqueous electrolytic solution preferably satisfy the relationship in the following formula (1).

$$[FSO_3^-]>[PO_2F_2^-]>[BOB^-] \tag{1}$$

The relationship in the following formulae (2) and (3) is further preferred to be satisfied.

$$([FSO_3^-]+[PO_2F_2^-])/([PO_2F_2^-]+[BOB^-])>1.8 \tag{2}$$

$$[FSO_3^-]<1.3\% \text{ by mass} \tag{3}$$

When the relationship in the above-described formula (1) is satisfied, $FSO_3^-$ can prevent $PO_2F_2^-$ and $BOB^-$ from forming a high-molecular-weight coating film locally, and a thin and uniform negative electrode coating is formed, thereby making it easier to further improve the initial power output under a low-temperature environment. When the relationships in the above-described formulae (2) and (3) are satisfied, the increase in film resistance derived from $BOB^-$ is suppressed by coating films derived from $FSO_3^-$ and $PO_2F_2^-$, and an effect of improving initial output under a low-temperature environment is more easily exhibited. As demonstrated in Examples below, the non-aqueous electrolytic solution used in the non-aqueous secondary battery is particularly preferable to be contained in the non-aqueous electrolytic solution as lithium fluorosulfonate ($FSO_3Li$), lithium difluorophosphate ($LiPO_2F_2$), and lithium bisoxalate borate (LiBOB).

<1-3. Electrolyte>

The non-aqueous electrolytic solution of the present embodiment, like general non-aqueous electrolytic solutions, usually contains an electrolyte as a component thereof. The electrolyte used in the non-aqueous electrolytic solution of the present embodiment is not particularly restricted, and any known electrolyte can be used. Specific examples of the electrolyte will be described in detail below.

<1-3-1. Lithium Salt>

As the electrolyte in the non-aqueous electrolytic solution of the embodiment, a lithium salt is usually used. The lithium salt is not particularly restricted as long as the salt is known to be used for this application, and one or more of any type can be used, and specific examples thereof include the following. Note that lithium salts in this section do not include $FSO_3Li$, $LiPO_2F_2$, and LiBOB described above.

Examples of the lithium salt include an inorganic lithium salt such as $LiBF_4$, $LiClO_4$, $LiAlF_4$, $LiSbF_6$, $LiTaF_6$, or $LiWF_7$;

- a lithium fluorophosphate salt such as $LiPF_6$;
- a lithium tungstate such as $LiWOF_5$;
- a lithium carboxylate salt such as $CF_3CO_2Li$;
- a lithium sulfonate salt such as $CH_3SO_3Li$;
- a lithium imide salt such as $LiN(FSO_2)_2$ or $LiN(CF_3SO_2)_2$; a lithium methide salt such as $LiC(FSO_2)_3$;
- a lithium oxalate salt such as lithium difluorooxalatoborate; and
- a fluorine-containing organic lithium salt such as $LiPF_4(CF_3)_2$.

From the viewpoint of further enhancing an effect of improving charge/discharge rate characteristics and impedance characteristics, a lithium salt is preferably selected from an inorganic lithium salt, a lithium fluorophosphate salt, a lithium sulfonate salt, a lithium imide salt, or a lithium oxalate salt.

The total concentration of these electrolytes in the non-aqueous electrolytic solution, with respect to the total amount of non-aqueous electrolytic solution, is not particularly restricted, and is usually 8% by mass or more, preferably 8.5% by mass or more, and more preferably 9% by mass or more. The upper limit is usually 18% by mass or less, preferably 17% by mass or less, and more preferably 16% by mass or less. When the total concentration of electrolyte is within the above-described range, the electrical conductivity is appropriate for battery operation, and therefore, sufficient output characteristics tend to be obtained.

<1-4. Non-Aqueous Solvent>

As with general non-aqueous electrolytic solutions, the non-aqueous electrolytic solution of the present embodiment usually contains, as a main component thereof, a non-aqueous solvent that dissolves the above-described electrolytes. There is no particular restriction on the non-aqueous solvent used herein, and any known organic solvent can be used. Examples of the organic solvent include a saturated cyclic carbonate, a chain carbonate, a carboxylic ester, an ether-based compound, or a sulfone-based compound. Although not limited thereto, the organic solvent is preferably a saturated cyclic carbonate, a chain carbonate, or a carboxylate ester, and more preferably a saturated cyclic carbonate or a chain carbonate. These can be used singly or two or more kinds thereof can be used in combination. As a combination of two or more kinds of non-aqueous solvents, a combination of two or more kinds selected from the group consisting of a saturated cyclic carbonate, a chain carbonate, and a carboxylate ester is preferred, and a combination of a saturated cyclic carbonate or a chain carbonate is more preferred.

<1-4-1. Saturated Cyclic Carbonate>

Examples of the saturated cyclic carbonate usually include those containing an alkylene group having from 2 to 4 carbon atoms, and from the viewpoint of improving battery characteristics derived from enhancement of lithium ion dissociation, a saturated cyclic carbonate having 2 to 3 carbon atoms is preferably used. The saturated cyclic carbonate may be a cyclic carbonate with a fluorine atom, such as monofluoroethylene carbonate.

Examples of the saturated cyclic carbonate include ethylene carbonate, propylene carbonate, and butylene carbonate. Among them, ethylene carbonate and propylene carbonate are preferred, and ethylene carbonate, which is less susceptible to oxidation and reduction, is more preferred. The saturated cyclic carbonate may be used singly, or two or more kinds thereof may be used together in any combination and in any ratio.

The content of the saturated cyclic carbonate is not particularly restricted, and is any amount as long as the effect of the invention of the present embodiment is not considerably impaired, and when one kind thereof is used singly, the lower limit of the content, with respect to the total solvent content of the non-aqueous electrolytic solution, is usually 3% by volume or more, and preferably 5% by volume or more. By setting the content of the saturated cyclic carbonate in this range, decrease in electrical conductivity derived from decrease in dielectric constant of the non-aqueous electrolytic solution is avoided, and it becomes easier to keep the high-current discharge characteristics, stability to a negative electrode, and cycle characteristics of the non-aqueous electrolytic solution secondary battery in a favorable range. The upper limit of the content of the saturated cyclic carbonate, with respect to the total solvent content of the non-aqueous electrolytic solution, is usually 90% by volume or less, preferably 85% by volume or less, and more preferably 80% by volume or less. By setting the content of the saturated cyclic carbonate in this range, the oxidation/reduction resistance of the non-aqueous electrolytic solution and the stability during storage at high temperature tends to be improved.

The % by volume in the present invention means the volume at 25° C. and 1 atmospheric pressure.

<1-4-2. Chain Carbonate>

As a chain carbonate, that having 3 to 7 carbon atoms is usually used, and in order to adjust the viscosity of an electrolytic solution to an appropriate range, a chain carbonate having 3 to 5 carbon atoms is preferably used.

Specific examples of a chain carbonate include dimethyl carbonate, diethyl carbonate, di-n-propyl carbonate, diisopropyl carbonate, n-propylisopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butylethyl carbonate, isobutylethyl carbonate, t-butylethyl carbonate.

Among them, dimethyl carbonate, diethyl carbonate, di-n-propyl carbonate, diisopropyl carbonate, n-propylisopropyl carbonate, ethyl methyl carbonate, and methyl-n-propyl carbonate are preferred, and dimethyl carbonate, diethyl carbonate, and ethyl methyl carbonate are particularly preferred.

A chain carbonate containing a fluorine atom (hereinafter, sometimes abbreviated as “fluorinated chain carbonate”) can also be suitably used. The number of fluorine atoms in a fluorinated chain carbonate is not particularly restricted as long as the number is 1 or more, and is usually 6 or less, preferably 4 or less. When a fluorinated chain carbonate contains a plurality of fluorine atoms, the atoms may bind to the same carbon or to different carbons. Examples of a fluorinated chain carbonate include a fluorinated dimethyl carbonate derivative, a fluorinated ethyl methyl carbonate derivative, and a fluorinated diethyl carbonate derivative.

Examples of a fluorinated dimethyl carbonate derivative include fluoromethyl methyl carbonate, difluoromethyl methyl carbonate, trifluoromethyl methyl carbonate, bis(fluoromethyl) carbonate, bis(difluoro) methyl carbonate, and bis(trifluoromethyl) carbonate.

Examples of a fluorinated ethyl methyl carbonate derivative include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of a fluorinated diethylcarbonate derivative include ethyl-(2-fluoroethyl) carbonate, ethyl-(2,2-difluoroethyl) carbonate, bis(2-fluoroethyl) carbonate, ethyl-(2,2,2-trifluoroethyl)carbonate, 2,2-difluoroethyl-2'-fluoroethyl carbonate, bis(2,2-difluoroethyl) carbonate, 2,2,2-trifluoroethyl-2'-fluoroethyl carbonate, 2,2,2-trifluoroethyl-2',2'-difluoroethylcarbonate, and bis(2,2,2-trifluoroethyl) carbonate.

The chain carbonate may be used singly, or two or more kinds thereof may be used together in any combination and in any ratio.

The content of a chain carbonate is not particularly limited, and is usually 15% by volume or more, and preferably 20% by volume or more, and more preferably 25% by volume or more with respect to the total amount of solvent in the non-aqueous electrolytic solution. The content is usually 90% by volume or less, and preferably 85% by volume or less, and more preferably 80% by volume or less with respect to the total amount of solvent in the non-aqueous electrolytic solution. By setting the content of a chain carbonate in the above-described range, the viscosity of the non-aqueous electrolytic solution is made to be in the appropriate range, decrease in ionic conductivity is suppressed, and in turn, the output characteristics of the non-aqueous electrolytic solution secondary battery can easily be in a favorable range. When two or more kinds of chain carbonates are used together, the total amount of chain carbonates may satisfy the above-described range.

Furthermore, by combining a specific content of ethylene carbonate with a specific chain carbonate, battery performance can be considerably improved.

For example, when dimethyl carbonate and ethyl methyl carbonate are selected as specific chain carbonates, the content of ethylene carbonate is not particularly limited and is any amount as long as the effect of the invention is not considerably impaired, and is usually 15% by volume or more, preferably 20% by volume or more, and usually 45% by volume or less, and preferably 40% by volume or less, with respect to the total amount of solvent in the non-aqueous electrolytic solution; the content of dimethyl carbonate is usually 20% by volume or more, and preferably 30% by volume or more, and usually 50% by volume or less, and preferably 45% by volume or less, with respect to the total amount of solvent in the non-aqueous electrolytic solution; and the content of ethyl methyl carbonate is usually 20% by volume or more, and preferably 30% by volume or more, and is usually 50% by volume or less, and preferably 45% by volume or less. When the content is within the above-described range, a high-temperature stability is excellent and gas generation tends to be suppressed.

<1-4-3. Ether-Based Compound>

As an ether-based compound, a chain ether having 3 to 10 carbon atoms and a cyclic ether having 3 to 6 carbon atoms are preferred.

The ether-based compound may be used singly, or two or more kinds thereof may be used together in any combination and ratio.

The content of the ether-based compound is not particularly restricted and is any amount as long as the effect of the invention is not considerably impaired, and the content in 100% by volume of the non-aqueous solvent is usually 1% by volume or more, and preferably 2% by volume or more, and more preferably 3% by volume or more, and is usually 30% by volume or less, and preferably 25% by volume or less, and more preferably 20% by volume or less. When two or more ether-based compounds are used together, the total amount of ether-based compounds may satisfy the above-described range. When the content of the ether-based compound is within the above-described preferable range, it is easy to ensure an effect of improving lithium ion dissociation of a chain ether and improving ion conductivity derived from reduced viscosity. When the negative electrode active material is a carbonaceous material, a phenomenon in which a chain ether is co-inserted together with lithium ion can be suppressed, and therefore input/output characteristics and charge/discharge rate characteristics can be set within an appropriate range.

<1-4-4. Sulfone-Based Compound>

A sulfone-based compound is not particularly restricted whether the compound is a cyclic sulfone or a chain sulfone, and in the case of cyclic sulfones, the number of carbons is usually from 3 to 6, preferably from 3 to 5, and in the case of chain sulfone, the number of carbons is usually from 2 to 6, preferably from 2 to 5. The number of sulfonyl groups in one molecule of a sulfone-based compound is not restricted, and is usually 1 or 2.

Examples of a cyclic sulfone include a monosulfone compound such as trimethylene sulfone, tetramethylene sulfone, or hexamethylene sulfone; and a disulfone compound such as trimethylene disulfone, tetramethylene disulfone, or hexamethylene disulfone. Among these, from the viewpoint of dielectric constant and viscosity, a tetramethylene sulfone, a tetramethylene disulfone, a hexamethylene sulfone, and a hexamethylene disulfone are more preferred, and a tetramethylene sulfone (sulfolane) is particularly preferred.

The sulfolane is a sulfolane and/or a sulfolane derivative (hereinafter sometimes abbreviated as "sulfolane", including sulfolane) is preferred for the sulfolanes. As a sulfolane derivative, those in which one or more of hydrogen atoms binding onto a carbon atom constituting a sulfolane ring is substituted with a fluorine atom or an alkyl group are preferred.

The sulfone-based compound may be used singly, or two or more kinds thereof may be used together in any combination and ratio.

The content of sulfone-based compound is not particularly restricted as long as the effect of the present invention is not significantly impaired, and is usually 0.3% by volume or more, preferably 0.5% by volume or more, more preferably 1% by volume or more, and usually 40% by volume or less, preferably 35% by volume or less, and more preferably 30% by volume or less, with respect to the total amount of solvent in the non-aqueous electrolytic solution. When two or more sulfone-based compounds are used together, the total amount of sulfone-based compounds may satisfy the above-described range. When the content of sulfone-based compounds is within the above-described range, an electrolytic solution with an excellent high-temperature preservation stability tends to be obtained.

<1-4-5. Carboxylate Ester>

The carboxylate ester is preferably a chain carboxylate ester, and more preferably a saturated chain carboxylate ester. The total carbon number of the carboxylate ester is usually from 3 to 7, and from the viewpoint of improved battery characteristics derived from improved output characteristics, carboxylate esters from 3 to 5 are preferably used.

Examples of the carboxylate ester include a saturated chain carboxylate ester such as methyl acetate, ethyl acetate, methyl propionate, ethyl propionate, methyl pivalate, or ethyl pivalate, and an unsaturated chain carboxylate ester such as methyl acrylate, ethyl acrylate, methyl methacrylate, or ethyl methacrylate. Among them, methyl acetate, ethyl acetate, methyl propionate, ethyl propionate, methyl pivalate, and ethyl pivalate are preferred, and methyl acetate, ethyl acetate, methyl propionate, and ethyl propionate are more preferred from the viewpoint of improving output characteristics. The carboxylate ester may be used singly, or two or more kinds thereof may be used together in any combination and ratio.

The content of carboxylate ester is not particularly restricted and may be any amount as long as the effect of the present invention is not impaired, and the lower limit is usually 3% by volume or more, preferably 5% by volume or more, with respect to the total amount of solvent in the non-aqueous electrolytic solution. By setting the lower limit of the carboxylate ester content in this range, decrease in electrical conductivity derived from decrease in dielectric constant of the non-aqueous electrolytic solution can be avoided, and high-current discharge characteristics, stability to a negative electrode, and cycle characteristics of the non-aqueous electrolytic solution secondary battery can be easily set within a favorable range. The upper limit is usually 90% by volume or less, preferably 85% by volume or less, and more preferably 80% by volume or less. This range tends to improve the oxidation and reduction resistance of the non-aqueous electrolytic solution and the stability of the solution during storage at high temperature.

The % by volume in the present embodiment means the volume at 25° C. and 1 atmospheric pressure.

<1-5. Other Fluorosulfonate>

The counter ion of fluorosulfonic acid ion contained in the other fluorosulfonates is not particularly limited, and examples thereof include rubidium, cesium, barium, and ammonium represented by $NR^{13}R^{14}R^{15}R^{16}$ (In the formula, $R^{13}$ to $R^{16}$ each independently represent a hydrogen atom or an organic group having from 1 to 12 carbon atoms), which are positive ions other than those listed in <1-1-1. Fluorosulfonic Acid Ion ($FSO_3^-$)>. Herein, $FSO_3^-$ includes a fluorosulfonic acid ion constituting the other fluorosulfonates.

Specific examples of the other fluorosulfonates include rubidium fluorosulfonate and cesium fluorosulfonate.

The other fluorosulfonates may be used singly, or two or more kinds thereof may be used in any combination and ratio. The total content of positive ions contained in $FSO_3^-$ and the other fluorosulfonates with respect to the entire non-aqueous electrolytic solution of the present embodiment in 100% by mass of the non-aqueous electrolytic solution is usually 0.001% by mass or more, preferably 0.01% by mass or more, more preferably 0.1% by mass or more, usually 15% by mass or less, and preferably 10% by mass or less, more preferably 5% by mass or less, further preferably 3% by mass or less, especially preferably 2% by mass or less, and particularly preferably 1% by mass or less. When two or more other fluorosulfonates are used in combination, the total amount of positive ions in $FSO_3^-$ and the other fluorosulfonates satisfy the above-described range.

When the total amount is within this range, swelling of the non-aqueous electrolytic solution secondary battery due to charging and discharging can be appropriately suppressed.

<1-6. Auxiliary Agent>

The following auxiliary agents may be contained in the non-aqueous electrolytic solution of the present embodiment to the extent that the effect of the present invention is achieved.

- An unsaturated cyclic carbonate such as vinylene carbonate, vinylethylene carbonate, or ethynylethylene carbonate;
- a carbonate compound such as methoxyethyl methyl carbonate;
- a spiro compound such as methyl-2-propynyl oxalate;
- a sulfur-containing compound such as ethylene sulfite;
- an isocyanate compound such as a diisocyanate containing a cycloalkylene group such as 1,3-bis(isocyanatomethyl)cyclohexane;
- a nitrogen-containing compound such as 1-methyl-2-pyrrolidinone;
- a hydrocarbon compound such as cycloheptane;
- a fluorine-containing aromatic compound such as fluorobenzene;
- a silane compound such as tris(trimethylsilyl)borate; an ester compound such as 2-propynyl 2-(methanesulfonyloxy)propionate;
- a lithium salt such as lithium ethyl methyloxycarbonyl phosphonate; and
- an isocyanate such as triallyl isocyanurate.

These may be used singly, or two or more kinds thereof may be used in combination. Addition of these auxiliary agents can improve the capacity maintenance characteristics or cycle characteristics after high-temperature preservation.

The content of the other auxiliary agents is not particularly restricted and is any amount as long as the effect of the present invention is not considerably compromised. The content of the other auxiliary agent with respect to the total amount of non-aqueous electrolytic solution is usually 0.01% by mass or more, preferably 0.1% by mass or more, more preferably 0.2% by mass or more, and usually 5% by mass or less, preferably 3% by mass or less, and more preferably 1% by mass or less. When the content is within this range, an effect of the other auxiliary agent is easily achieved sufficiently, and a high-temperature preservation stability tends to be improved. When two or more kinds of other auxiliary agents are used in combination, the total amount of the other auxiliary agents may satisfy the above-described range.

Herein, the composition of the non-aqueous electrolytic solution means the composition when a battery in which the non-aqueous electrolytic solution has been poured is shipped. However, it is not necessary to analyze the composition of a non-aqueous electrolytic solution at the time of shipment, and a battery may be prepared in such a manner that the composition at the time of shipment is within a desired range by measuring the content of constituents at the time of manufacturing the non-aqueous electrolytic solution or pouring the non-aqueous electrolytic solution into the battery, or the like.

In other words, the non-aqueous electrolytic solution may be mixed in such a manner that the ratio of each constituent reaches a predetermined composition when the non-aqueous electrolytic solution is prepared. After preparing the non-aqueous electrolytic solution, the non-aqueous electrolytic solution itself can be subjected to analysis to confirm the composition. The non-aqueous electrolytic solution may be recovered from the completed non-aqueous electrolytic solution secondary battery and subjected to analysis. Examples of a method of recovering a non-aqueous electrolytic solution include a method of extracting an electrolytic solution by opening part or all of a battery container, or by making a hole in a battery container. An opened battery container may be centrifuged to recover an electrolytic solution, or an extraction solvent (for example, acetonitrile dehydrated to less than 10 ppm water content is preferred) may be placed in an opened battery container or by bringing an extraction solvent into contact with a battery element to extract an electrolytic solution. A non-aqueous electrolytic solution recovered in such a manner can be used for analysis. The recovered non-aqueous electrolytic solution may be diluted for analysis in order to create conditions suitable for analysis.

Optimal methods for analyzing non-aqueous electrolytic solutions vary depending on the type of composition of the non-aqueous electrolytic solution, or the like, and specific examples thereof include analysis by inductively coupled plasma (ICP) emission spectrometry, nuclear magnetic resonance (hereinafter sometimes abbreviated as NMR), gas chromatography, and liquid chromatography, such as ion chromatography. In the following, an analysis method by NMR is described. Under an inert atmosphere, a non-aqueous electrolytic solution is dissolved in a heavy solvent dehydrated to 10 ppm or less and placed in an NMR tube for NMR measurements. A duplex tube may be used as an NMR tube, with a non-aqueous electrolytic solution in one tube and a heavy solvent in the other, and NMR measurements may be performed. Examples of the heavy solvent include heavy acetonitrile and heavy dimethyl sulfoxide. When determining the concentration of constituents of a non-aqueous electrolytic solution, the concentration of each constituent can be calculated from the ratio of spectra by dissolving a specified amount of a standard substance in a heavy solvent. The concentration of one or more components constituting a non-aqueous electrolytic solution can be determined in advance by another analytical method such as gas chromatography, and the concentration can be calculated from the spectral ratio of the component with the known concentration to the other components. A nuclear magnetic resonance analyzer used is preferably one with a proton resonance frequency of 400 MHz or higher. Examples of measurement nuclides include $^{1}H$, $^{31}P$, $^{19}F$, and $^{11}B$.

These analysis methods may be used singly, or two or more kinds thereof may be used in combination.

<2. Non-Aqueous Electrolytic Solution Secondary Battery>

A non-aqueous electrolytic solution secondary battery according to one embodiment of the present invention is a non-aqueous electrolytic solution secondary battery including a positive electrode and a negative electrode capable of absorbing and releasing metal ions, and the non-aqueous electrolytic solution to one embodiment of the present invention, as described above. More specifically, this battery includes: a positive electrode containing a current collector and a positive electrode active material layer provided on the current collector; a negative electrode containing a current collector and a negative electrode active material layer provided on the current collector and capable of absorbing and releasing metal ions; and a non-aqueous electrolytic solution.

<2-1. Battery Configuration>

The non-aqueous electrolytic solution secondary battery according to the present embodiment has the same configuration as conventionally known non-aqueous electrolytic solution secondary batteries, except for the non-aqueous electrolytic solution. Normally has a configuration in which a positive electrode and a negative electrode are layered via a porous membrane (separator) impregnated with a non-aqueous electrolytic solution, and these are stored in a case (outer casing). Therefore, the shape of the non-aqueous electrolytic solution secondary battery according to the present embodiment is not particularly restricted, and may be cylindrical, rectangular, laminated, coin-shaped, large, or any other type.

<2-2. Non-Aqueous Electrolytic Solution>

As the non-aqueous electrolytic solution, the above-described non-aqueous electrolytic solution according to one embodiment of the present invention is used. Another non-aqueous electrolytic solution can also be mixed with the above-described non-aqueous electrolytic solution and used in a range not departing from the spirit of the invention.

<2-3. Positive Electrode>

In one embodiment of the present invention, a positive electrode includes a current collector and a positive electrode active material layer on the current collector.

In the following, a positive electrode used in the non-aqueous electrolytic solution secondary battery of the present embodiment will be described in detail.

<2-3-1. Positive Electrode Active Material>

The positive electrode active material used in the positive electrode is described below.

(1) Composition

A positive electrode active material is not particularly restricted as long as the material is electrochemically capable of absorbing and releasing metal ions, and for example, a material that is electrochemically capable of absorbing and releasing lithium ions is preferred, and it is preferable to contain at least one selected from the group consisting of a lithium-cobalt composite oxide, a lithium-cobalt-nickel composite oxide, a lithium-manganese composite oxide, a lithium-cobalt-manganese composite oxide, a lithium-nickel composite oxide, a lithium-nickel-manganese composite oxide, and a lithium-cobalt-nickel-manganese composite oxide. This is because a transition metal contained in these composite oxides has a redox potential suitable for use as a positive electrode material in secondary batteries, and is suitable for high-capacity applications.

As a transition metal component of the above-described composite oxide (also referred to as lithium transition metal oxide), Ni, Co, and/or Mn can be included, and another metal such as V, Ti, Cr, Fe, Cu, Al, Mg, Zr, or Er can be included, and Ti, Fe, Al, Mg, or Zr is preferred. Specific examples of lithium transition metal oxides include $LiCoO_2$, $LiNi_{0.85}Co_{0.10}Al_{0.05}O_2$, $LiNi_{0.80}Co_{0.15}Al_{0.05}O_2$, $LiNi_{0.33}Co_{0.33}Mn_{0.33}O_2$, $Li_{1.05}Ni_{0.33}Mn_{0.33}Co_{0.33}O_2$, $LiNi_{0.5}Co_{0.2}Mn_{0.3}O_2$, $Li_{1.05}Ni_{0.50}Mn_{0.29}Co_{0.21}O_2$, $LiNi_{0.6}Co_{0.2}Mn_{0.2}O_2$, $LiNi_{0.8}Co_{0.1}Mn_{0.1}O_2$, $LiMn_2O_4$, $LiMn_{1.0}Al_{0.2}O_4$, and $LiMn_{1.5}Ni_{0.5}O_4$.

Two or more kinds of the above-described positive electrode active materials may be mixed together. Similarly, at least one or more of the above-described positive electrode active materials may be mixed with other positive electrode active materials for use. Examples of another positive electrode active material include a transition metal oxide, a transition metal phosphate compound, a transition metal silicate compound, and a transition metal borate compound, which are not listed above.

As a transition metal in the above-described lithium-containing transition metal phosphate compound, V, Ti, Cr, Mn, Fe, Co, Ni, Cu, or the like is preferred, and specific examples thereof include an iron phosphate such as $LiFePO_4$, $Li_3Fe_2(PO_4)_3$, or $LiFeP_2O_7$, a cobalt phosphate such as $LiCoPO_4$, a manganese phosphate such as $LiMnPO_4$, and one in which the main transition metal atoms of these lithium transition metal phosphate compounds are partially substituted with other metals such as Al, Ti, V, Cr, Mn, Fe, Co, Li, Ni, Cu, Zn, Mg, Ga, Zr, Si, Nb, Mo, Sn, or W.

Among these, a lithium iron phosphate compound is preferred since iron is an extremely inexpensive metal with abundant resources, and is less toxic. In other words, a more preferred specific example of the above-described specific examples is $LiFePO_4$.

(2) Surface Coating

A substance with a composition different from that of the main positive electrode active material (hereinafter referred to as "surface-attached substance") can also be used on a surface of the above positive electrode active material. Examples of the surface-attached substance include an oxide such as aluminum oxide, silicon oxide, titanium oxide, zirconium oxide, magnesium oxide, calcium oxide, boron oxide, antimony oxide, or bismuth oxide; a sulfate such as lithium sulfate, sodium sulfate, potassium sulfate, magnesium sulfate, calcium sulfate, or aluminum sulfate; a carbonate such as lithium carbonate, calcium carbonate, or magnesium carbonate; and carbon.

These surface-attached substances can be attached to a surface of the positive electrode active material by, for example, a method in which the substance is dissolved or suspended in a solvent, added to the positive electrode active material by impregnation, and then dried; a method in which a surface-attached substance precursor is dissolved or suspended in a solvent, and added to the positive electrode active material by impregnation, and then reacted by heating or the like; and a method in which the substance is added to the positive electrode active material precursor and sintered simultaneously. When carbon is attached, a method of mechanically attaching carbonaceous material later in the form of activated carbon or the like can also be used.

The mass of the surface-attached substance on the surface of the positive electrode active material, with respect the mass of the positive electrode active material, is preferably 0.1 ppm or more, more preferably 1 ppm or more, and further preferably 10 ppm or more. The ratio is preferably 20% or less, more preferably 10% or less, further preferably 5% or less.

By using the surface-attached substance, oxidation reaction of the non-aqueous electrolytic solution on the surface of the positive electrode active material can be suppressed, and battery life can be improved. When the amount of attached substance is within the above-described range, the effect can be sufficiently exhibited, and the resistance is less likely to increase since it does not inhibit the entry and exit of lithium ions.

(3) Shape

The shape of the positive electrode active material particle can be lumpy, polyhedral, spherical, ellipsoidal, plate-like, needle-like, columnar, or the like, as conventionally used. The positive electrode active material particle may be a secondary particle which is formed by aggregated primary particles, which may be spherical or ellipsoidal in shape.

(4) Method of Manufacturing Positive Electrode Active Material

The method of manufacturing a positive electrode active material is not particularly restricted as long as the method does not exceed the gist of the present invention, and examples thereof include several methods, and a general method for manufacturing inorganic compounds is used.

In particular, a variety of methods can be considered for producing spherical or ellipsoidal active materials, and one example is a method including; dissolving or grinding and dispersing a transition metal raw material such as transition metal nitrate or sulfate and, if necessary, a raw material of another element in a solvent such as water; adjusting the pH while stirring to prepare and collect a spherical precursor; during the precursor as necessary; adding a Li source such as LiOH, $Li_2CO_3$, or $LiNO_3$, and then calcinating them at high temperature to obtain a positive electrode active material.

An example of another method is a method including; dissolving or grinding and dispersing a transition metal raw material such as a transition metal nitrate, sulfate, hydroxide, or oxide, and a raw material of another element, if necessary, in a solvent such as water; and then drying and molding it using a spray dryer to form a spherical or ellipsoidal precursor; adding a Li source such as LiOH, $Li_2CO_3$, or $LiNO_3$; and calcinating them at high temperature to obtain a positive electrode active material.

Still another example of the method is a method including; dissolving or grinding and dispersing a transition metal raw material such as transition metal nitrate, sulfate, hydroxide, or oxide, a Li source such as LiOH, $Li_2CO_3$, or $LiNO_3$, and a raw material of another element, if necessary, in a solvent such as water; drying and molding it with a spray dryer to form a spherical or ellipsoidal precursor; and calcinating it at high temperature to obtain an active material.

<2-3-2. Positive Electrode Structure and Preparation Method>

In the following, the configuration of a positive electrode used in the present embodiment and a preparation method thereof will be described.

(Preparation Method of Positive Electrode)

A positive electrode is prepared by forming a positive electrode active material layer, which contains a positive electrode active material particle and a binder, on a current collector. A positive electrode using a positive electrode active material can be prepared by any known method. For example, a positive electrode can be obtained by forming a positive electrode active material layer on a current collector either by dry mixing a positive electrode active material, a binder, and, if necessary, a conductive material and a thickening agent, in sheet form, and pressing the sheet onto a positive electrode current collector, or by dissolving or dispersing these materials in a liquid medium to form a slurry; applying the slurry to a positive electrode current collector, and then drying the slurry.

The content of a positive electrode active material in a positive electrode active material layer is preferably 60% by mass or more, more preferably 70% by mass or more, and further preferably 80% by mass or more, and preferably 99.9% by mass or less, and more preferably 99% by mass or less. When the content of the positive electrode active material is within the above-described range, the electrical capacity can be sufficiently secured. Furthermore, the strength of the positive electrode is also sufficient. Positive electrode active material powder in the present invention may be used singly, or two or more kinds of different compositions or different powder properties may be used together in any combination and ratio. When combining two or more kinds of active materials, it is preferable to use the above-described composite oxide containing lithium and manganese as a component of a powder. This is because, as described above, cobalt or nickel is an expensive metal with few resources, and use of an active material in large batteries requiring high capacity, such as for automotive applications, is not favorable from the viewpoint of cost since the amount of the active material used is large, and therefore it is desirable to use manganese as the main component.

<2-4. Negative Electrode>

The following describes a negative electrode active material used in a negative electrode. The negative electrode active material is not particularly restricted as long as the material is capable of electrochemically absorbing and releasing metal ions. Specific examples thereof include those containing carbon as a constituent element, such as a carbonaceous material or an alloy-based material. These may be used singly or, two or more kinds thereof may be used together in any combination.

<2-4-1. Negative Electrode Active Material>

Examples of a negative electrode active material include a carbonaceous material and an alloy-based material, as described above.

Examples of the carbonaceous materials include (1) natural graphite, (2) artificial graphite, (3) amorphous carbon, (4) carbon-coated graphite, (5) graphite-coated graphite, and (6) resin-coated graphite.

Examples of (1) natural graphite include scaly graphite, scale graphite, soil graphite, and/or graphite particles obtained by spheroidizing, densifying, or the like on these graphite raw materials. Among them, spherical or ellipsoidal graphite that has undergone spheroidizing process is particularly preferred from the viewpoint of particle filling and charge/discharge rate characteristics.

For example, an apparatus that repeatedly applies mechanical actions such as compression, friction, and shear forces to particles, mainly impact forces and including particle interactions, can be used for the above-described spheroidizing process.

Specifically, the spheroidizing process is preferably performed by a rotor with a number of blades installed inside a casing, which rotates at high speed to apply mechanical actions such as impact compression, friction, and shear to (1) natural graphite raw material introduced into the casing. An apparatus having a mechanism that repeatedly applies mechanical action by circulating a raw material is preferred.

For example, when the spheroidizing process is performed using the above-described apparatus, the circumferential velocity of a rotating rotor is set preferably at from 30 to 100 m/sec, more preferably at from 40 to 100 m/sec, and further preferably at from 50 to 100 m/sec. Although spheroidizing process can be performed by simply passing a raw material through an apparatus, it is preferable to circulate or dwell in the apparatus for 30 seconds or longer, and it is more preferable to circulate or dwell in the apparatus for 1 minute or longer.

Examples of (2) artificial graphite include those produced by graphitizing an organic compound such as coal tar pitch, coal-based heavy oil, atmospheric residual oil, petroleum-based heavy oil, aromatic hydrocarbons, nitrogen-containing cyclic compounds, sulfur-containing cyclic compounds, polyphenylene, polyvinyl chloride, polyvinyl alcohol, polyacrylonitrile, polyvinyl butyral, natural polymer, polyphenylene sulfide, polyphenylene oxide, furfuryl alcohol resin, phenol-formaldehyde resin, or imide resin at a temperature in the range of usually 2,500° C. or higher, and usually 3,200° C. or lower, and then crushing and/or classifying the graphite if necessary.

In this case, a silicon-containing compound or a boron-containing compound can be used as a graphitization catalyst. Examples thereof include artificial graphite obtained by graphitizing meso-carbon microbeads separated during a heat treatment process of a pitch. Further examples thereof include artificial graphite of granulated particles composed of primary particles. Examples thereof include graphite particles composed of a plurality of flattened particles, assembled or bonded in such a manner that the oriented planes are non-parallel, obtained by mixing graphitizable carbonaceous material powders, such as mesocarbon microbeads, coke, and graphitizable binding agents, such as tar and pitch, with graphitization catalysts, graphitizing, and then pulverizing if necessary.

Examples of (3) amorphous carbon include amorphous carbon particles made from an easily graphitizable carbon precursor such as tar or pitch and heat-treated one or more times in the temperature range (from 400 to 2,200° C.) where graphitization does not occur, and amorphous carbon particles made from a hardly graphitizable carbon precursor such as a resin and heat-treated.

Examples of (4) carbon-coated graphite include those obtained as follows. Natural graphite and/or artificial graphite is mixed with a carbon precursor, which is an organic compound such as tar, pitch, or a resin, and then heat-treated at least once in the range of from 400 to 2,300° C. The resulting natural graphite and/or artificial graphite is used as a core graphite, which is then coated with amorphous carbon to obtain a carbon graphite composite. This carbon graphite composite may be (4) carbon-coated graphite.

The form of the above-described composite may be a form in which amorphous carbon coats the entire surface or part of the surface of a core graphite, or a form in which a plurality of primary particles are composited with carbon derived from the carbon precursor as a binding agent. The carbon graphite composite can also be obtained by reacting natural and/or artificial graphite with a hydrocarbon gas such as benzene, toluene, methane, propane, or an aromatic volatile, at high temperature, thereby depositing carbon on the graphite surface (CVD).

Examples of (5) graphite-coated graphite include those obtained as follows. Natural graphite and/or artificial graphite is mixed with a carbon precursor of an easily graphitizable organic compound such as tar, pitch, or a resin, and then heat-treated at least once in the range of about from 2,400 to 3,200° C. The obtained natural graphite and/or artificial graphite is used as a core graphite, and the graphite-coated graphite (5) is obtained by coating the entire surface or part of the core graphite with graphitized substance.

(6) Resin-coated graphite is obtained, for example, by mixing natural graphite and/or artificial graphite with a resin or the like, drying at a temperature of less than 400° C., using the natural graphite and/or artificial graphite as core graphite, and coating the core graphite with a resin or the like.

The above-described carbonaceous materials (1) to (6) may be used singly, or two or more kinds thereof may be used together in any combination and ratio.

Examples of an organic compound such as tar, pitch, or a resin used for carbonaceous materials in (2) to (5) above include a carbonizable organic compound selected from the group consisting of coal-based heavy oil, direct current heavy oil, pyrolysis petroleum heavy oil, an aromatic hydrocarbon, an N-ring compound, an S-ring compound, polyphenylene, a synthetic organic polymer, a natural polymer, a thermoplastic resin, and a thermosetting resin. A raw material organic compound may be dissolved in a low molecular weight organic solvent to adjust the viscosity during mixing.

As natural graphite and/or artificial graphite as a raw material for core graphite, graphite subjected to a spheroidizing process is preferred.

Next, the above-described alloy-based material used as a negative electrode active material may be elemental lithium, an elemental metal and an alloy that form a lithium alloy, or a compound such as an oxide, a carbide, a nitride, a silicide, a sulfide, or a phosphide thereof, as long as they are capable of absorbing and releasing lithium. The elemental metal and alloy that form a lithium alloy are preferably materials containing metallic and semimetallic elements of Groups 13 and 14 (or excluding carbon), more preferably elemental metals of aluminum, silicon and tin, and alloys or compounds containing these atoms, and further preferably those containing silicon or tin as a constituent element, such as elemental metals of silicon and tin, and alloys or compounds containing these atoms.

These may be used singly, or two or more kinds thereof may be used together in any combination and ratio.

<Metal Particles Alloyable with Li>

When an elemental metal and an alloy that form a lithium alloy, or a compound such as an oxide, carbide, nitride, silicide, sulfide, or phosphide thereof, is used as a negative electrode active material, a metal alloyable with Li is in a particle form. Examples of a technique for confirming that the metal particle is a metal particle alloyable with Li include identification of a metal particle phase by X-ray diffraction, observation of particle structure and elemental analysis by electron microscopy, and elemental analysis by X-ray fluorescence.

Any conventionally known metal particles alloyable with Li may be used, and from the viewpoint of capacity and cycle life of a non-aqueous electrolytic solution secondary batteries, the metal particle is preferably, for example, a metal selected from the group consisting of Fe, Co, Sb, Bi, Pb, Ni, Ag, Si, Sn, Al, Zr, Cr, P, S, V, Mn, As, Nb, Mo, Cu, Zn, Ge, In, Ti, and W, or a compound thereof. An alloy composed of two or more kinds of metals may be used, and the metal particles may be alloy particles formed by two or more kinds of metal elements. Among them, metals selected from the group consisting of Si, Sn, As, Sb, Al, Zn, and W, or metal compounds thereof, are preferred.

Examples of the above-described metal compound include a metal oxide, a metal nitride, and a metal carbide. An alloy composed of two or more metals may also be used.

Among metal particles alloyable with Li, Si or an Si metal compound is preferred. The Si metal compound is preferably an Si metal oxide. Si or an Si metal compound is preferred from the viewpoint of high capacity of batteries. Herein, Si or an Si metal compound is collectively referred to as an Si compound. Examples of the Si compound include SiOx, SiNx, SiCx, and SiZxOy (Z=C, N). The Si compound is preferably an Si metal oxide, and the Si metal oxide is represented by the general formula $SiO_x$. This general formula SiOx is obtained from Si dioxide ($SiO_2$) and metal Si (Si), and the value of x is usually $0 \le x < 2$. $SiO_x$ has a higher theoretical capacity than graphite, and furthermore, amorphous Si or nano-sized Si crystals allow alkali ions such as lithium ions to enter and exit easily, enabling high capacity to be obtained.

Specifically, the Si metal oxide is represented by $SiO_x$, where x satisfies $0 \le x < 2$, and x is more preferably 0.2 or more and 1.8 or less, further preferably 0.4 or more and 1.6 or less, and particularly preferably 0.6 or more and 1.4 or less. This range allows a battery to have high capacity and at the same time reduces an irreversible capacity due to bonding between Li and oxygen.

<Oxygen Content of Metal Particles Alloyable with Li>

The oxygen content of metal particles alloyable with Li is not particularly restricted, and is usually 0.01% by mass or more and 8% by mass or less, and preferably 0.05% by mass or more and 5% by mass or less. As for the oxygen distribution state in particles, the oxygen may be present in the vicinity of the surface, inside the particles, or uniformly within the particles, and it is particularly preferable that the oxygen is present near the surface. When the oxygen content of metal particles alloyable with Li is within the above-described range, strong bonding between the metal particles and O (oxygen atoms) suppresses the volume expansion caused by charge/discharge of non-aqueous electrolytic solution secondary battery, resulting in excellent cycle characteristics, which is preferable.

<Negative Electrode Active Material Containing Metal Particles Alloyable with Li and Graphite Particles>

A negative electrode active material may contain metal particles alloyable with Li and graphite particles. The negative electrode active material may be a mixture of metal particles alloyable with Li and graphite particles in the form of independent particles, or may be a composite in which metal particles alloyable with Li are present on the surface and/or inside of graphite particles.

The above-described composite of metal particles alloyable with Li and graphite particles (also called composite particles) is not particularly restricted as long as the particles contain metal particles alloyable with Li and graphite particles, and preferably are particles in which the metal particles alloyable with Li and graphite particles are integrated by physical and/or chemical bonding. A more preferable form is one in which the metal particles alloyable with Li and the graphite particles are present in such a manner that each solid component is dispersed within the particle to the extent that they are present at least on the surface of the composite particle and in the bulk interior, and the graphite particles are present to integrate them by physical and/or chemical bonding. A further specific preferable form is a composite material (negative electrode active material) composed at least of metal particles alloyable with Li and graphite particles, wherein the graphite particles, preferably natural graphite, have a folded structure with a curved surface, and wherein metal particles alloyable with Li are present in a gap in the structure. The gap may be a void, or a substance such as amorphous carbon, a graphitic material, or a resin may be present in the above-described gap to buffer expansion and contraction of the metal particles alloyable with Li.

<Content Ratio of Metal Particles Alloyable with Li>

The content ratio of metal particles alloyable with Li to the total of metal particles alloyable with Li and graphite particles is usually 0.1% by mass or more, preferably 0.5% by mass or more, more preferably 1.0% by mass or more, and further preferably 2.0% by mass or more. The content ratio is usually 99% by mass or less, preferably 50% by mass or less, more preferably 40% by mass or less, further preferably 30% by mass or less, still further preferably 25% by mass or less, still further preferably 20% by mass or less, particularly preferably 15% by mass or less, and most preferably 10% by mass or less. This range is preferable in that side reactions on the Si surface can be controlled and sufficient capacity can be obtained in non-aqueous electrolytic solution secondary batteries.

<Coating Ratio>

In the present embodiment, a negative electrode active material may be coated with carbonaceous or graphite material. Among these, being coated with amorphous carbonaceous material is preferred in terms of lithium ion acceptability. This coating ratio is usually 0.5% or more and 30% or less, and preferably 1% or more and 25% or less, and more preferably 2% or more and 20% or less. The upper limit of the coating ratio is preferably in the above-described range from the viewpoint of reversible capacity when a battery is assembled, and the lower limit of the coating ratio is preferably in the above-described range from the viewpoint of solid granulation of a core carbonaceous material by uniformly coating with amorphous carbon and particle diameter of particles obtained when the material is pulverized after sintering.

The coating ratio (content ratio) of carbides derived from an organic compound in an eventually obtained negative electrode active material can be calculated by the following formula based on the amount of the negative electrode active material, the amount of the organic compound, and the residual carbon ratio measured by the micro method in accordance with JIS K 2270.

Formula: coating ratio of carbides derived from organic compounds (%)=(mass of organic compound×residual carbon ratio×100)/{mass of negative electrode active material+(mass of organic compound×residual carbon ratio)}

<Internal Gap Ratio>

The internal gap ratio of a negative electrode active material is usually 1% or more, preferably 3% or more, more preferably 5% or more, and further preferably 7% or more. The ratio is usually less than 50%, and preferably 40% or less, more preferably 30% or less, and further preferably 20% or less. When the internal gap ratio is too small, the amount of liquid in the negative electrode active material particles tends to be low in a non-aqueous electrolytic solution secondary battery. On the other hand, when the internal gap ratio is too large, inter-particle gaps tend to be reduced when the material is made into electrodes. From the viewpoint of charge/discharge characteristics, the lower limit of the internal gap ratio is preferable to be within the above-described range, and from the viewpoint of diffusion of non-aqueous electrolytic solution, the upper limit is preferable to be within the above-described range. As described above, this gap may be a void, or a material such as amorphous carbon, graphitic material, a resin, or the like, which buffers expansion and contraction of metal particles alloyable with Li, may be present in the gap or the gap may be filled with these materials.

<2-4-2. Configuration and Preparation Method of Negative Electrode>

As long as the effect of the present invention is not considerably impaired, any known method can be used to manufacture a negative electrode. For example, to a negative electrode active material, a binding agent, a solvent, and, if necessary, a thickening agent, a conductive material, a filler, and the like are added to form a slurry, and this slurry is applied to a current collector, dried, and pressed to form a negative electrode.

An alloy-based material negative electrode can be manufactured using any of the known methods. Specific examples of the method of manufacturing negative electrodes include a method of making a sheet electrode by roll forming the above-described negative electrode active material with a binding agent, a conductive material, and the like as they are, or a method of making a pellet electrode by compression molding, and usually, a method of forming a thin film layer (negative electrode active material layer) containing the above-described negative electrode active material on a current collector for the negative electrode (hereinafter, sometimes referred to as "negative electrode current collector") by coating, vapor deposition, sputtering, plating, or the like is used. In this case, to the above-described negative electrode active material, a binding agent, a thickening agent, a conductive material, and a solvent are added to form a slurry, and the slurry is applied to a negative electrode collector, dried, and pressed to densify the slurry to form a negative electrode active material layer on the negative electrode collector.

Examples of the material of the negative electrode current collector include steel, copper, a copper alloy, nickel, a nickel alloy, and stainless steel. Among them, copper foil is preferred in terms of ease of processing into a thin film and cost.

The thickness of a negative electrode current collector is usually 1 μm or more, preferably 5 μm or more, and usually 100 μm or less, and preferably 50 μm or less. When the thickness of the negative electrode current collector is too thick, the overall capacity of a non-aqueous electrolytic solution secondary battery may decrease too much, while when the thickness is too thin, the handleability may become difficult.

In order to improve a binding effect to a negative electrode active material layer formed on the surface, the surfaces of the negative electrode current collector is preferably roughened in advance. Examples of surface roughening methods include blasting, rolling with a roughening roll, a mechanical polishing method in which the current collector surface is polished with abrasive cloth paper with abrasive particles adhered, grinding wheels, emery buffs, a wire brush with steel wires or the like, an electropolishing method, and a chemical polishing method.

In order to reduce the mass of a negative electrode current collector and increase the energy density per battery mass, a perforated type negative electrode current collector, such as expanded metal or perforated metal, can be used. The mass of a negative electrode current collector of this type can be freely changed by changing the aperture ratio. When negative electrode active material layers are formed on both sides of a negative electrode current collector of this type, the riveting effect through the aperture makes peeling of the negative electrode active material layers further difficult to occur. However, when the aperture ratio is too high, the contact area between a negative electrode active material layer and a negative electrode current collector becomes small, and the adhesive strength may be lowered instead.

Slurry to form a negative electrode active material layer is usually prepared by adding a binding agent, a thickening agent, or the like to a negative electrode material. Herein, "negative electrode material" refers to a material combining a negative electrode active material and a conductive material.

The content of a negative electrode active material in a negative electrode material is preferably usually 70% by mass or more, particularly 75% by mass or more, and usually 97% by mass or less, particularly 95% by mass or less. When the content of a negative electrode active material is too small, the capacity of a secondary battery using a resulting negative electrode tends to be insufficient, and when the content is too large, it tends to be difficult to ensure the electrical conductivity as a negative electrode due to a relative shortage of conductive material content. When two or more negative electrode active materials are used together, the total amount of negative electrode active materials can satisfy the above-described range.

Examples of the conductive material used for negative electrodes include a metal material such as copper or nickel; and a carbon material such as graphite or carbon black. These may be used singly, or two or more kinds thereof may be used together in any combination and ratio. In particular, use of a carbon material as a conductive material is preferred because the carbon material also acts as an active material. The content of conductive material in a negative electrode material is usually 3% by mass or more, preferably 5% by mass or more, and usually 30% by mass or less, and preferably 25% by mass or less. When the content of conductive material is too little, the conductivity tends to be insufficient, and when the content is too large, the battery capacity and strength tend to decrease due to relative shortage of the content of negative electrode active material and the like. When two or more conductive materials are used together, the total amount of conductive materials can satisfy the above-described range.

As a binding agent used for a negative electrode, any material that is safe for a solvent or an electrolytic solution used in electrode manufacturing can be used. Examples thereof include polyvinylidene fluoride, polytetrafluoroethylene, polyethylene, polypropylene, styrene-butadiene rubber, isoprene rubber, butadiene rubber, ethylene-acrylic acid copolymer, and ethylene-methacrylic acid copolymer. These may be used singly, or two or more kinds thereof may be used together in any combination and ratio. The content of a binding agent, with respect to 100 parts by mass of a negative electrode material, is usually 0.5 parts by mass or more, and preferably 1 part by mass or more, and usually 10 parts by mass or less, and preferably 8 parts by mass or less. When the content of a binding agent is too small, the strength of a resulting negative electrode tends to be insufficient, and when the content is too large, the battery capacity and conductivity tend to be insufficient due to a relatively low content of a negative electrode active material or the like. When two or more kinds of binders are used together, the total amount of binders can satisfy the above-described range.

Examples of a thickening agent used for a negative electrode include carboxymethyl cellulose, methyl cellulose, hydroxymethyl cellulose, ethyl cellulose, polyvinyl alcohol, starch oxide, starch phosphate, and casein. These may be used singly, or two or more kinds thereof may be used together in any combination and ratio. A thickening agent may be used as necessary, and when used, the thickening agent is preferably used within a range where the content of the thickening agent in a negative electrode active material layer is usually 0.5% by mass or more and 5% by mass or less.

A slurry to form a negative electrode active material layer is prepared by mixing the above-described negative electrode active material with a conductive material, a binding agent, and a thickening agent, if necessary, using an aqueous solvent or an organic solvent as a dispersing medium. Water is usually used as an aqueous solvent, and an organic solvent such as an alcohol such as ethanol or a cyclic amide such as N-methylpyrrolidone can be used in combination with water within a range of 30% by mass or less of the water. Examples of the organic solvent include a cyclic amide such as N-methylpyrrolidone, a linear amide such as N,N-dimethylformamide or N,N-dimethylacetamide, an aromatic hydrocarbon such as anisole, toluene, or xylene, and an alcohol such as butanol or cyclohexanol, and among them, a cyclic amide such as N-methylpyrrolidone or a linear amide such as N,N-dimethylformamide or N,N-dimethylacetamide is preferred. These may be used singly, or two or more kinds thereof may be used together in any combination and ratio.

The resulting slurry is applied on the above-described negative electrode current collector, dried, and pressed to form a negative electrode active material layer to obtain a negative electrode. The coating method is not particularly restricted, and any method known per se can be used. The drying method is also not particularly restricted, and known methods such as natural drying, heating drying, decompression drying, and the like can be used.

<Electrode Density>

The electrode structure when a negative electrode active material is made into an electrode is not particularly restricted, and the density of the negative electrode active material present on the current collector is preferably 1 $g \cdot cm^{-3}$ or more, further preferably 1.2 $g \cdot cm^{-3}$ or more, and particularly preferably 1.3 $g \cdot cm^{-3}$ or more, and preferably 2.2 $g \cdot cm^{-3}$ or less, more preferably 2.1 $g \cdot cm^{-3}$ or less, further preferably 2.0 $g \cdot cm^{-3}$ or less, and particularly preferably 1.9 $g \cdot cm^{-3}$ or less. When the density of a negative electrode active material on a current collector exceeds the above-described range, negative electrode active material particles may be destroyed, leading to an increase in the initial irreversible capacity of a non-aqueous electrolytic solution secondary battery and deterioration of high current density charge/discharge characteristics due to reduced penetration of a non-aqueous electrolytic solution near the current collector/negative electrode active material interface. When the density is below the above-described range, the conductivity between negative electrode active materials may decrease, battery resistance may increase, and the capacity per unit volume may decrease.

<Conductive Material>

As a conductive material, any known conductive material can be used. Specific examples thereof include a metal material such as copper or nickel; graphite (graphite) such as natural graphite or artificial graphite; carbon black such as acetylene black; and a carbonaceous material such as needle coke. These may be used singly, or two or more kinds thereof may be used together in any combination and ratio.

The content of a conductive material in a positive electrode active material layer is preferably 0.01% by mass or more, more preferably 0.1% by mass or more, and further preferably 1% by mass or more, and preferably 50% by mass or less, more preferably 30% by mass or less, and further preferably 15% by mass or less. When the content is within the above-described range, the conductivity can be sufficiently ensured. Furthermore, a decrease in battery capacity is also easily prevented.

<Binder>

A binder used in production of a positive electrode active material layer is not particularly limited as long as the binder is a material that is stable against a non-aqueous electrolytic solution or a solvent used in production of an electrode.

In the case of a coating method, the binder is not particularly limited as long as the binder is a material that can be dissolved or dispersed in a liquid medium used during electrode production, and examples thereof include a resin polymer such as polyethylene, polypropylene, polyethylene terephthalate, polymethyl methacrylate, aromatic polyamide, cellulose, or nitrocellulose; a rubber-like polymer such as SBR (styrene-butadiene rubber), NBR (acrylonitrile-butadiene rubber), fluoro rubber, isoprene rubber, butadiene rubber, or ethylene-propylene rubber; a thermoplastic elastomer-like polymer such as styrene-butadiene-styrene block copolymers or a hydrogenated product thereof, EPDM (ethylene-propylene-diene ternary copolymer), styrene-ethylene-butadiene-ethylene copolymer, or a styrene-isoprene-styrene block copolymer, or a hydrogenated product thereof; a soft resin-like polymer such as syndiotactic-1,2-polybutadiene, polyvinyl acetate, ethylene-vinyl acetate copolymer, or propylene-alpha-olefin copolymer; a fluorinated polymer such as polyvinylidene fluoride (PVdF), polytetrafluoroethylene, fluorinated polyvinylydene fluoride, or a tetrafluoroethylene-ethylene copolymer; and a polymer composition with an ion conductivity of an alkali metal ion (especially lithium ion). These substances may be used singly, or two or more kinds thereof may be used together in any combination and ratio.

The content of a binder in a positive electrode active material layer is preferably 0.1% by mass or more, more preferably 1% by mass or more, and further more preferably 3% by mass or more, and preferably 80% by mass or less, more preferably 60% by mass or less, further preferably 40% by mass or less, and particularly preferably 10% by mass or less. When the ratio of the binder is within the above-described range, sufficient positive electrode active material can be retained and mechanical strength of a positive electrode can be secured, resulting in favorable battery performance such as cycle characteristics. This also leads to avoiding a decrease in battery capacity and conductivity.

<Liquid Medium>

A liquid medium used to prepare a slurry for forming a positive electrode active material layer is not particularly restricted as long as the medium is a solvent capable of dissolving or dispersing a positive electrode active material, a conductive material, a binder, and a thickening agent used as needed, and may be either aqueous solvent or organic solvent.

Examples of the aqueous medium include water and a mixture of alcohol and water. Examples of the organic medium include an aliphatic hydrocarbon such as hexane; an aromatic hydrocarbon such as benzene, toluene, xylene, or methylnaphthalene; a heterocyclic compound such as quinoline or pyridine; a ketone such as acetone, methyl ethyl ketone, or cyclohexanone; an ester such as methyl acetate or methyl acrylate; an amine such as diethylenetriamine or N,N-dimethylaminopropylamine; an ether such as diethyl ether or tetrahydrofuran (THF); an amide such as N-methylpyrrolidone (NMP), dimethylformamide, or dimethylacetamide; and a non-protonic polar solvent such as hexamethylphospharamide or dimethyl sulfoxide. These may be used singly, or two or more kinds thereof may be used in any combination and ratio.

<Thickening Agent>

When an aqueous medium is used as a liquid medium to form a slurry, it is preferable to make the slurry with a thickening agent and a latex such as styrene-butadiene rubber (SBR). A thickening agent is usually used to adjust the viscosity of the slurry.

A thickening agent is not restricted as long as the thickening agent does not considerably restrict the effect of the present invention, and specific examples thereof include carboxymethyl cellulose, methyl cellulose, hydroxymethyl cellulose, ethyl cellulose, polyvinyl alcohol, oxidized starch, phosphorylated starch, casein, and a salt thereof. These may be used singly, or in combination of two or more kinds thereof in any combination and ratio.

When a thickening agent is used, the ratio of the thickening agent to a positive electrode active material is preferably 0.1% by mass or more, more preferably 0.5% by mass or more, and further preferably 0.6% by mass or more, and preferably 5% by mass or less, more preferably 3% by mass or less, and further preferably 2% by mass or less. When the ratio of a thickening agent is within the above-described range, the applicability becomes favorable, and furthermore, the ratio of an active material in a positive electrode active material layer becomes sufficient, which makes it easier to avoid a problem of a decrease in capacity of a secondary battery and an increase in resistance between positive electrode active materials.

<Compaction>

In order to increase the packing density of a positive electrode active material, a positive electrode active material layer obtained by applying and drying the above-described slurry on a current collector is preferably compacted by a hand press, a roller press, or the like. The density of a positive electrode active material layer is preferably 1 $g \cdot cm^{-3}$ or more, further preferably 1.5 $g \cdot cm^{-3}$ or more, particularly preferably 2 $g \cdot cm^{-3}$ or more, and preferably 4 $g \cdot cm^{-3}$ or less, further preferably 3.5 $g \cdot cm^{-3}$ or less, and particularly preferably 3 $g \cdot cm^{-3}$ or less.

When the density of a positive electrode active material layer is within the above-described range, the penetration of a non-aqueous electrolytic solution in the vicinity of the current collector/active material interface does not deteriorate, resulting in favorable charge/discharge characteristics, particularly at high current densities in secondary batteries. Furthermore, conductivity between active materials is less likely to decrease, and battery resistance is less likely to increase.

<Current Collector>

The material of a positive electrode current collector is not particularly restricted, and any known material can be used. Specific examples thereof include a metal material such as aluminum, stainless steel, nickel plating, titanium, or tantalum; a carbonaceous material such as carbon cloth or carbon paper. Among them, a metal material, in particular aluminum, is preferred.

In the case of a metal material, examples of the shape of a current collector include metal foil, metal cylinder, metal coil, metal plate, metal thin film, expanded metal, punched metal, and foamed metal, and in the case of a carbonaceous material, examples of the shape of the current collector include carbon plate, carbon thin film, and carbon cylinder. Among them, metal thin film is preferred. The thin film may be formed into a mesh as appropriate.

The thickness of a current collector is any thickness, and is preferably 1 μm or more, more preferably 3 μm or more, and further preferably 5 μm or more, and preferably 1 mm or less, more preferably 100 μm or less, and further preferably 50 μm or less. When the thickness of a current collector is within the above-described range, sufficient strength needed as a current collector can be secured. Furthermore, the handleability is also favorable.

The ratio of the thickness of a positive electrode active material layer to the thickness of a current collector is not particularly limited, and the ratio (thickness of active material layer on one side immediately before pouring non-aqueous electrolytic solution)/(thickness of current collector) is preferably 150 or less, more preferably 20 or less, particularly preferably 10 or less, and preferably 0.1 or more, more preferably 0.4 or more, and particularly preferably 1 or more.

When the ratio of the thickness of a current collector to that of a positive electrode active material layer is within the above-described range, the current collector is less likely to generate heat due to Joule heat during high current density charging and discharging. Furthermore, the volume ratio of the current collector to the positive electrode active material is less likely to increase, preventing a decrease in battery capacity.

<Electrode Area>

From the viewpoint of high output and stability at high temperature, the area of a positive electrode active material layer is preferably large in relation to the outer surface area of a battery outer packaging case. Specifically, the total electrode area of the above-described positive electrode relative to the surface area of an outer packaging of a non-aqueous electrolytic solution secondary battery in area ratio is preferably 20 times or more, and more preferably 40 times or more. In the case of a bottomed rectangular shape, the outer surface area of the outer packaging case refers to the total area calculated from the dimensions of the length, the width, and the thickness of a case portion filled with a power generating element, excluding a protruding portion of a terminal. In the case of a bottomed cylindrical shape, the outer surface area refers to the geometric surface area that approximates a case portion filled with power generation elements as a cylinder, excluding a protruding portion of a terminal. The total electrode area of a positive electrode is the geometric surface area of a positive electrode composite layer opposite to a composite layer containing a negative electrode active material, and in the case of a structure where positive electrode composite layers are formed on both sides of a current collector foil, the total area is the sum of the areas calculated for each side separately.

<Discharge Capacity>

When the above-described non-aqueous electrolytic solution is used, a battery element having an electric capacity (electric capacity when the battery is discharged from the fully charged state to the discharged state) of 1 ampere-hour (Ah) or more in a single battery casing of the non-aqueous electrolytic solution secondary battery is preferred since an improving effect on low-temperature discharge characteristics is large. Therefore, a positive electrode plate is designed in such a manner that the discharge capacity is preferably 3 Ah (ampere-hours) or more, more preferably 4 Ah or more, and preferably 100 Ah or less, more preferably 70 Ah or less, and particularly preferably 50 Ah or less, on a full charge.

The discharge capacity is within the above-described range, a voltage drop due to electrode reaction resistance during high current extraction is not too large, and deterioration of power efficiency can be prevented. Furthermore, the temperature distribution due to internal heat generation during pulse charging/discharging is not too large, resulting that poor durability for repeated charging/discharging and poor heat dissipation efficiency against sudden heat generation during abnormal conditions such as overcharge or internal short circuit can also be avoided.

<Thickness of Positive Electrode Plate>

The thickness of a positive electrode plate is not particularly limited, and from the viewpoint of high capacity, high output, and high rate characteristics, the thickness of a positive electrode active material layer, which is obtained by subtracting the thickness of the current collector, is preferably 10 μm or more, more preferably 20 μm or more, and preferably 200 μm or less, more preferably 100 μm or less, for one side of the current collector.

<2-5. Separator>

In a non-aqueous electrolytic solution secondary battery, a separator is usually interposed between a positive electrode and a negative electrode to prevent short circuits. In this case, the non-aqueous electrolytic solution of the present embodiment is usually impregnated into this separator.

The material or the shape of a separator is not particularly restricted, and any known material can be employed as long as the separator does not considerably impair the effect of the present invention. Among them, a resin, a glass fiber, an inorganic material, or the like formed of a material stable to the non-aqueous electrolytic solution of the present embodiment is preferably used, and a porous sheet or a nonwoven fabric form with excellent liquid retention properties is preferably used.

Examples of a material for resin or glass fiber separators include a polyolefin such as polyethylene or polypropylene, polytetrafluoroethylene, polyethersulfone, and a glass filter. Among them, a glass filter and polyolefin are more preferred, and polyolefin is further preferred. These materials may be used singly, or two or more kinds thereof may be used together in any combination and ratio.

The thickness of the above-described separator is any thickness, and is usually 1 μm or thicker, and preferably 5 μm or thicker, and more preferably 10 μm or thicker, and is usually 50 μm or less, and preferably 40 μm or less, and more preferably 30 μm or less. When the separator is too thinner than the above-described range, the insulation or mechanical strength may be reduced. When the separator is thicker than the above-described range, not only the battery performance such as rate characteristics may be reduced, but also the energy density of the non-aqueous electrolytic solution secondary battery as a whole may be reduced.

Further, when a porous material such as a porous sheet or nonwoven fabric is used as a separator, the porosity of the separator is any, and is usually 20% or more, and preferably 35% or more, and more preferably 45% or more, and is usually 90% or less, and preferably 85% or less, and more preferably 75% or less. When the porosity is smaller than the above-described range, the film resistance tends to increase and the rate characteristics tend to deteriorate. When the porosity is larger than the above-described range, the mechanical strength of the separator tends to decrease and the insulation properties tend to deteriorate.

The average pore size of a separator is also any, and is usually 0.5 μm or less, and preferably 0.2 μm or less, and usually 0.05 μm or more. When the average pore size exceeds the above-described range, a short circuit is more likely to occur. When the average pore size is below the above-described range, the film resistance may increase and the rate characteristics may decrease.

On the other hand, as inorganic materials, for example, an oxide such as alumina or silicon dioxide, a nitride such as aluminum nitride or silicon nitride, or a sulfate such as barium sulfate or calcium sulfate are used, which are in the form of particles or fibers.

Examples of a form used include a thin film shape such as a nonwoven fabric, a woven fabric, or a microporous film. A thin film shape with a pore size of from 0.01 to 1 μm and a thickness of from 5 to 50 μm is suitable. In addition to the above-described independent thin film shape, a separator which is made by forming a composite porous layer containing the above-described inorganic particles on the surface layer of a positive electrode and/or a negative electrode using a binding agent made of resin can also be used. For example, porous layers are formed on both sides of a positive electrode with alumina particles with a 90% particle size of less than 1 μm and fluororesin as a binding agent.

<2-6. Battery Design>

[Electrode Group]

An electrode group may have either a layered structure composed of the above-described positive electrode plate and negative electrode plate via the above-described separator, or a spirally wound structure composed of the above-described positive electrode plate and negative electrode plate via the above-described separator. The ratio of the volume of an electrode group to the internal volume of a battery (hereinafter, referred to as "electrode group occupancy ratio") is usually 40% or more, and more preferably 50% or more, and usually 90% or less, and preferably 80% or less. The lower limit of the electrode group occupancy ratio is preferably in the above-described range from the viewpoint of battery capacity. The upper limit of the electrode group occupancy ratio is preferably in the above-described range from the viewpoint of battery performance in terms of charge/discharge repetitive performance, high-temperature preservation characteristics, and avoidance of gas release valve operation that releases internal pressure to the outside, in order to secure the gap space. When the gap space is too small, the internal pressure increases due to expansion of components and the vapor pressure of a liquid component of an electrolytic solution when a battery is heated to high temperature, which may degrade various characteristics of the battery, such as charge/discharge repetitive performance and high-temperature storage, or may activate a gas release valve that releases internal pressure to the outside.

[Current Collection Structure]

A current collection structure is not particularly limited, and in order to more effectively improve discharge characteristics with the above-described non-aqueous electrolytic solution, it is preferable to use a structure that reduces the resistance of a wiring portion or a junction portion. When internal resistance is reduced in such a manner, the effect of using the above-described non-aqueous electrolytic solution is particularly favorably exhibited.

In the case of an electrode group having the above-described layered structure, a structure formed by bundling metal core portions of respective electrode layers and welding these portions to a terminal is suitably used. When the electrode area of a single electrode is large, the internal resistance will be large, and therefore, it is also suitable to provide a plurality of terminals in an electrode to reduce the resistance. When an electrode group has the above-described wound structure, the internal resistance can be lowered by providing a plurality of lead structures in each of a positive electrode and a negative electrode and bundling these structures to a terminal.

[Protection Element]

Examples of a protection element include a positive temperature coefficient (PTC) whose resistance increases when abnormal heat generation or excessive current flows, a thermal fuse, a thermistor, and a valve (current shutoff valve) that shuts off current flowing into a circuit due to a sudden increase in internal battery pressure or temperature when abnormal heat generation occurs. It is preferable to select a protection element that does not operate under conditions of normal use at high currents, and from the viewpoint of high output, it is more preferable to design a battery that does not generate abnormal heat or lead to thermal runaway even without a protection element.

[Outer Casing]

The non-aqueous electrolytic solution secondary battery of the present embodiment is usually composed of the above-described non-aqueous electrolytic solution, a negative electrode, a positive electrode, a separator, and the like in an outer casing (outer packaging case). The outer casing is not limited, and any known outer casing can be adopted as long as the effect of the invention is not considerably impaired.

The material of an outer packaging case is not particularly limited as long as the material is stable to a non-aqueous electrolytic solution used. Specific examples thereof include a metal such as a nickel-plated steel sheet, a stainless steel, an aluminum or aluminum alloy, a magnesium alloy, nickel or titanium, or a layered film (laminated film) composed of a resin and an aluminum foil.

Examples of the outer packaging case using the above-described metal include those that have a hermetically sealed structure by welding metals together using laser welding, resistance welding, or ultrasonic welding, or those that have a welded structure using the above-described metals via a resin gasket. Examples of an outer packaging case using the above-described laminated film include one in which resin layers are thermally fused to each other to form a sealed and hermetically sealed structure. In order to improve sealing performance, a resin different from that used for a laminated film may be interposed between the above-described resin layers. In particular, when resin layers are thermally bonded via current-collecting terminals to form a hermetically sealed structure, resins with polar groups or modified resins with polar groups are suitably used as interposing resins since a metal and a resin are bonded together.

The shape of an outer casing is also any shape, and may be, for example, cylindrical, rectangular, laminated, coin-shaped, or large type.

<2-7. Battery Break-In Operation>

[Initial Charging]

Initial charging is performed on the non-aqueous electrolytic solution secondary battery prepared as described above. For charging conditions, for example, an upper limit voltage is preferably from 3.5 to 4.4 V. At a voltage lower than 3.5 V, an effect of improving discharge capacity tends to be insufficient, and at a voltage higher than 4.4 V, lithium may precipitate on the negative electrode, resulting in a decrease in capacity. The charging current is preferably in the range of 2 C or less. Currents higher than 2 C (1 C refers to a current value that takes one hour to charge or discharge. The same applies hereinafter.) tend not to be sufficiently effective in improving the discharge current. Furthermore, since the longer the time between the end of non-aqueous electrolytic solution secondary battery assembly and the start of the initial charging, the lower the productivity, it is preferable to perform the initial charging within 5 days.

Here, in the embodiment of the present invention, the initial charging is performed under an environment at or above room temperature, particularly in the range of 25° C. or more and 60° C. or less. By performing the initial charging under an environment in the range of 25° C. or more and 60° C. or less, the discharge capacity can be further improved. When the temperature is lower than 25° C., an effect of improving discharge capacity tends to be insufficient, and when the temperature is higher than 60° C., the coating film of the negative electrode may dissolve and the initial characteristics may deteriorate. Therefore, by performing the initial charging under an environment in the range of 25° C. or more and 60° C. or less, the non-aqueous electrolytic solution secondary battery has excellent initial characteristics.

[Storage Under High-Temperature Environment (Aging Process)]

The non-aqueous electrolytic solution secondary battery that has been initially charged as described above is stored under a high-temperature environment (hereinafter, sometimes referred to as "aging (process)"). For the storage conditions under a high-temperature environment, for example, the battery voltage is preferably 3.5 V or higher, more preferably 3.55 V or higher, and particularly preferably 3.6 V or higher. On the other hand, the upper limit is preferably 4.4 V or less, more preferably 4.3 V or less, and particularly preferably 4.2 V or less. At voltages lower than 3.5 V, no reduction reaction occurs on the surface of the negative electrode, and therefore an effect of improving the initial characteristics may not be sufficiently obtained. There is a relationship between battery voltage and state of charge (SOC), and SOC can be used instead of battery voltage as a storage condition under a high-temperature environment. SOC can be determined using a charge/discharge curve of a non-aqueous electrolytic solution secondary battery based on the battery voltage, and for example, the SOC is preferably 17% or higher, more preferably 22% or higher, and particularly preferably 30% or higher. On the other hand, the upper limit is preferably 98% or less, more preferably 96% or less, and particularly preferably 95% or less. When the SOC is lower than 17%, no reduction reaction occurs on the surface of the negative electrode, and an effect of improving the initial characteristics may not be sufficiently obtained. When the SOC is higher than 98%, an excessive coating film is formed on the surface of the negative electrode, which may lead to higher resistance and lower battery output. Storage time under a high-temperature environment is preferably 12 hours or more, more preferably 14 hours or more, and particularly preferably 16 hours or more. On the other hand, the upper limit is preferably 200 hours or less, further preferably 150 hours or less, and particularly preferably 100 hours or less. When the time is shorter than 12 hours, a reduction reaction does not occur sufficiently on the surface of the negative electrode, and an effect of improving the initial characteristics may not be sufficient. When the time is longer than 200 hours, an excessive coating film is formed on the surface of the negative electrode, which tends to increase the resistance and reduce the battery output. The lower limit for storage temperature under a high-temperature environment is preferably 50° C. or higher, more preferably 55° C. or higher, and particularly preferably 60° C. or higher. On the other hand, the upper limit is preferably 80° C. or less, more preferably 75° C. or less, and particularly preferably 70° C. or less. At temperatures lower than 50° C., a reduction reaction of an electrolytic solution on the surface of the negative electrode does not occur uniformly, resulting in variations in the amount of coating formed on the surface of the negative electrode, and areas with more coating film and areas with less coating film would coexist on the surface of the negative electrode. When the input/output test described above is performed under such a condition, the battery output may be reduced due to the high resistance of the area with a large amount of coating film. At temperatures higher than 80° C., the negative electrode coating film formed during the initial charging tends to dissolve and the initial characteristics deteriorate. Therefore, by storing the battery under the above-described temperature, the reduction reaction of an electrolytic solution on the surface of the negative electrode occurs uniformly and a uniform coating film is formed on the surface of the negative electrode, resulting in excellent initial characteristics of the non-aqueous electrolytic solution secondary battery.

The change in battery voltage when stored under a high-temperature environment, especially voltage change when stored for 24 hours under a high-temperature environment of 50° C. or higher, preferably 60° C. or more and 80° C. or less, is preferably 33 mV or higher, further preferably 35 mV or higher, and particularly preferably 40 mV or higher. On the other hand, the upper limit is preferably 100 mV or less, more preferably 75 mV or less, and particularly preferably 50 mV or less. When the voltage is less than 33 mV, the reduction reaction does not occur sufficiently on the surface of the negative electrode, and an effect of improving the initial characteristics may not be sufficient. When the voltage is higher than 100 mV, an excessive coating film is formed on the surface of the negative electrode, resulting in higher resistance and lower battery output.

In order to reinforce the coating film on the surface of the negative electrode, the non-aqueous electrolytic solution secondary battery may be stored under a high-temperature environment a plurality of times after battery break-in operation has been completed.

EXAMPLES

The present invention is further described in detail below with Examples and Reference Examples, but the present invention is not limited to these Examples unless exceeding the gist of the present invention.

Examples 1-1 to 1-4, Comparative Examples 1-1 to 1-8

[Preparation of Negative Electrode]

To 98 parts by mass of natural graphite, one part by mass of aqueous dispersion of sodium carboxymethylcellulose (1% by mass concentration of sodium carboxymethylcellulose) and one part by mass of aqueous dispersion of styrene-butadiene rubber (50% by mass concentration of styrene-butadiene rubber) were added as a thickening agent and a binding agent, and the mixture was mixed with a disperser to make a slurry. The resulting slurry was applied to one side of a 10 μm thick copper foil, dried, and pressed to form a negative electrode.

[Preparation of Positive Electrode]

85 parts by mass of $Li(Ni_{1/3}Mn_{1/3}Co_{1/3})O_2$ as a positive electrode active material, 10 parts by mass of acetylene black as a conductive material, and 5 parts by mass of polyvinylidene fluoride (PVdF) as a binding agent were mixed in N-methylpyrrolidone solvent with a disperser to make a slurry. This was uniformly applied to one side of a 15 μm thick aluminum foil, dried, and pressed to make a positive electrode.

[Preparation of Non-Aqueous Electrolytic Solution]

A basic electrolytic solution 1 was prepared by dissolving dried $LiPF_6$ in a mixture of ethylene carbonate (EC), ethyl methyl carbonate (EMC), and dimethyl carbonate (DMC) (volume ratio 30:35:35) at a ratio of 1.1 mol/L under a dry argon atmosphere. To the basic electrolytic solution 1 made above, $FSO_3Li$, $LiPO_2F_2$, and LiBOB were added to prepare a non-aqueous electrolytic solution as described in Table 1 below. In parentheses in the table, the concentration of fluorosulfonic acid ion $[FSO_3^-]$, the concentration of difluorophosphate ion $[PO_2F_2^-]$, and the concentration of bisoxalate borate ion $[BOB^-]$ are shown.

[Manufacture of Non-Aqueous Electrolytic Solution Secondary Battery]

The above-described positive electrode, negative electrode, and polyethylene separator were layered in the order of the negative electrode, the separator, and the positive electrode to prepare a battery element. This battery element was inserted into a bag made of laminated film coated with a resin layer on both sides of aluminum (40 μm thick) with the terminals of the positive and negative electrodes protruding, and then the non-aqueous electrolytic solution prepared as described above was injected into the bag and vacuum-sealed to prepare a laminated type non-aqueous electrolytic solution secondary battery.

[Battery Break-In Operation]

The non-aqueous electrolytic solution secondary batteries were subjected to constant-current-constant-voltage charging (hereinafter, referred to as "CC-CV charging") at a current equivalent to ⅙ C to 4.2 V and then discharged at ⅙ C to 2.5 V in a thermostatic bath at 25° C., with the battery sandwiched between glass plates to enhance adhesion between the electrodes. CC-CV charging was performed up to 4.1 V at ⅙ C. Aging was then performed at 60° C. for 24 hours or 45° C. for 24 hours. The non-aqueous electrolytic solution secondary batteries were then discharged to 2.5 V at ⅙ C to stabilize the batteries. Furthermore, after CC-CV charging to 4.2 V at ⅙ C, the batteries were discharged to 2.5 V at ⅙ C, and battery break-in operation was thereby performed.

In the present Example, in order to closely examine an effect of storage temperature in an aging process on the initial output characteristics after the battery break-in operation, the initial output characteristics of batteries that were run through the break-in operation at two different storage temperatures were compared and evaluated. From the results of ion chromatography, it was confirmed that the composition of the non-aqueous electrolytic solution at the time of preparation satisfied formula (1) even after the aging process.

[Evaluation of Initial Output Characteristics]

The batteries that had completed evaluation of the battery break-in operation were charged at 25° C. to 3.72 V at a constant current of ⅙ C. The batteries were discharged at 0.5 C, 1.0 C, 1.5 C, 2.0 C, and 2.5 C at −20° C., respectively, and the voltage at 5 seconds was measured. Resistance value (0) was obtained from the slope of the current-voltage line. Table 1 shows the relative values (%) when the resistance value (reference resistance value) of Example 1-1 after aging at 60° C. for 24 hours was set to 100.0. In the present Example, from the viewpoint of practicality, the resistance value when aging was performed at 60° C. for 24 hours was considered acceptable if the resistance value was equal to or less than the reference resistance value.

TABLE 1

| | Composition of lithium salts (ions) in non-aqueous electrolytic solution: $[FSO_3Li]$ $([FSO_3^-])$ (% by mass) | $[LiPO_2F_2]$ $([PO_2F_2^-])$ (% by mass) | [LiBOB] $([BOB^-])$ (% by mass) | Voltage change before and after storage: Storage temperature: 45° C. (mV) | Storage temperature: 60° C. (mV) | Initial Output Characteristics: Storage temperature: 45° C. (%) | Storage temperature: 60° C. (%) |
|---|---|---|---|---|---|---|---|
| Example 1-1 | 1.0(0.93) | 0.6(0.56) | 0.3(0.29) | 23.4 | 34.2 | 102.5 | 100 |
| Example 1-2 | 1.2(1.1) | 0.45(0.42) | 0.35(0.34) | 24.2 | 35.5 | 100.7 | 99.2 |
| Example 1-3 | 0.75(0.7) | 0.65(0.61) | 0.5(0.48) | 23.8 | 34.2 | 101.9 | 100 |
| Example 1-4 | 1.0(0.93) | 0.9(0.84) | 0.1(0.1) | 23.3 | 35.7 | 113.3 | 99.3 |
| Comparative Example 1-1 | 0.5(0.47) | 0.5(0.47) | 0.5(0.48) | 23.8 | 34.4 | 102.7 | 101.2 |
| Comparative Example 1-2 | 0.15(0.14) | 0.5(0.47) | 0.5(0.48) | 23.1 | 34.7 | 112.1 | 106.8 |
| Comparative Example 1-3 | 0.15(0.14) | 0.1(0.09) | 0.1(0.1) | 29 | 39.5 | 114.1 | 103.8 |
| Comparative Example 1-4 | 1.0(0.93) | 0.5(0.47) | 0.5(0.48) | 23.8 | 34.7 | 115.9 | 102.5 |
| Comparative Example 1-5 | 0.4(0.37) | 0.6(0.56) | 1.0(0.96) | 24.3 | 34.6 | 107.2 | 103.8 |
| Comparative Example 1-6 | 0.6(0.56) | 0.6(0.56) | 0.8(0.77) | 23.2 | 33.8 | 106.8 | 128.5 |
| Comparative Example 1-7 | 0.6(0.56) | 0.8(0.75) | 0.6(0.58) | 23.0 | 33.4 | 102.5 | 118.2 |
| Comparative Example 1-8 | 0.8(0.75) | 0.8(0.75) | 0.7(0.67) | 26.4 | 39.8 | 103.4 | 104.9 |

Table 1 clearly shows that Examples satisfying the relationship $[FSO_3^-]>[PO_2F_2^-]>[BOB^-]$ had excellent initial output characteristics. Furthermore, when the storage temperature was 45° C., the change in battery voltage before and after storage was smaller than 33 mV, while when the storage temperature was 60° C., the change in battery voltage before and after storage was 33 mV or more. When the relationship $[FSO_3^-]>[PO_2F_2^-]>[BOB^-]$ was satisfied and the storage temperature was 45° C. (when the storage temperature in Examples 1-1 to 1-4 is 45° C.), the initial output characteristic was lower than when the relationship $[FSO_3^-]>[PO_2F_2^-]>[BOB^-]$ was satisfied and the storage temperature was 60° C. (when the storage temperature in Examples 1-1 to 1-4 was 60° C.).

It can be seen that when the relationship $[FSO_3^-]>[PO_2F_2^-]>[BOB^-]$ was not satisfied (Comparative Examples 1-1 to 1-8), the initial output characteristic was lower regardless of the storage temperature compared to the case where the relationship $[FSO_3^-]>[PO_2F_2^-]>[BOB^-]$ was satisfied and the storage temperature was 60° C. (the storage temperature in Examples 1-1 to 1-4 was 60° C.). According to Examples 1-1 to 1-4 and Comparative Examples 1-1 to 1-8, it was found that when using a non-aqueous electrolytic solution in which the content of $FSO_3^-$, $PO_2F_2^-$, and $BOB^-$ were within a specific range and when the voltage change when stored under a high-temperature environment was 33 mV or higher, the output characteristics of the non-aqueous electrolytic solution secondary battery under a low-temperature environment were improved.

Examples 2-1 to 2-4, Comparative Examples 2-1 to 2-7

[Preparation of Negative Electrode]

Negative electrodes were prepared in the same manner as in Example 1-1, except that the slurry containing the negative electrode active material was applied to both sides of the copper foil.

[Preparation of Positive Electrode]

90 parts by mass of Li $(Ni_{0.5}Mn_{0.3}Co_{0.2})O_2$ as a positive electrode active material, 7 parts by mass of acetylene black as a conductive material, and 3 parts by mass of polyvinylidene fluoride (PVdF) as a binding agent were mixed in N-methylpyrrolidone solvent with a disperser to make a slurry. This was uniformly applied to one side of a 15 μm thick aluminum foil, dried, and pressed to make a positive electrode.

[Preparation of Non-Aqueous Electrolytic Solution]Non-aqueous electrolytic solutions listed in Table 2 below were prepared in the same manner as in Example 1-1 or the like. In parentheses in the table, the concentration of fluorosulfonic acid ion $[FSO_3^-]$, the concentration of difluorophosphate ion $[PO_2F_2^-]$, and the concentration of bisoxalate borate ion $[BOB^-]$ are shown.

[Preparation of Non-Aqueous Electrolytic Solution Secondary Battery]

Non-aqueous electrolytic solution secondary batteries were prepared in the same manner as in Example 1-1 or the like.

[Battery Break-In Operation]

Battery break-in operation was performed in the same manner as in Example 1-1 and others. From the results of ion chromatography, it was confirmed that the composition of the non-aqueous electrolytic solution at the time of preparation satisfied formula (1) even after the aging process.

[Evaluation of Initial Output Characteristics]

The batteries that had completed evaluation of the battery break-in operation were charged at 25° C. to 3.72 V at a constant current of ⅙C. The batteries were discharged at 0.5 C, 1.0 C, 1.5 C, 2.0 C, and 2.5 C at −20° C., respectively, and the voltage at 5 seconds was measured. Resistance value (Ω) was obtained from the slope of the current-voltage line. Table 2 shows the relative values (%) when the resistance value (reference resistance value) of Example 2-1 after aging at 60° C. for 24 hours was set to 100.0. In the present Example, from the viewpoint of practicality, the resistance value when aging was performed at 60° C. for 24 hours was considered acceptable if the resistance value was equal to or less than the reference resistance value.

TABLE 2

| | Composition of lithium salts (ions) in non-aqueous electrolytic solution | | | Voltage change before and after storage | | Initial Output Characteristics | |
|---|---|---|---|---|---|---|---|
| | $[FSO_3Li]$ ($[FSO_3^-]$) (% by mass) | $[LiPO_2F_2]$ ($[PO_2F_2^-]$) (% by mass) | [LiBOB] ($[BOB^-]$) (% by mass) | Storage temperature: 45° C. (mV) | Storage temperature: 60° C. (mV) | Storage temperature: 45° C. (%) | Storage temperature: 60° C. (%) |
| Example 2-1 | 1.4(1.3) | 0.4(0.37) | 0.2(0.19) | 31.7 | 44.6 | 101.7 | 100 |
| Example 2-2 | 0.75(0.7) | 0.65(0.61) | 0.5(0.48) | 29.3 | 41.6 | 104.8 | 98.9 |
| Example 2-3 | 1.3(1.2) | 0.6(0.56) | 0.1(0.1) | 32.6 | 45.1 | 102.3 | 92.7 |
| Example 2-4 | 1.0(0.93) | 0.9(0.84) | 0.1(0.1) | 32 | 42.9 | 101.3 | 89.5 |
| Comparative Example 2-1 | 0.4(0.37) | 0.6(0.56) | 1.0(0.96) | 28.6 | 41.2 | 112.8 | 110.7 |
| Comparative Example 2-2 | 0.6(0.56) | 0.6(0.56) | 0.8(0.77) | 29.2 | 40.5 | 109.6 | 109.3 |
| Comparative Example 2-3 | 1.0(0.93) | 0.5(0.47) | 0.5(0.48) | 29.9 | 43 | 105.3 | 104.5 |
| Comparative Example 2-4 | 0.5(0.47) | 0.5(0.47) | 0.5(0.48) | 30.3 | 44.4 | 108.6 | 100.7 |
| Comparative Example 2-5 | 0.15(0.14) | 0.5(0.47) | 0.5(0.48) | 32.8 | 49.3 | 110.9 | 102.3 |
| Comparative Example 2-6 | 0.15(0.14) | 0.1(0.09) | 0.1(0.1) | 30.8 | 42.5 | 111.9 | 108.2 |
| Comparative Example 2-7 | 0.8(0.75) | 0.8(0.75) | 0.7(0.67) | 30.1 | 43.7 | 106.7 | 104.8 |

Table 2 clearly shows that Examples satisfying the relationship $[FSO_3^-]>[PO_2F_2^-]>[BOB^-]$ had excellent initial output characteristics. Furthermore, when the storage temperature was 45° C., the change in battery voltage before and after storage was smaller than 33 mV, while when the storage temperature was 60° C., the change in battery voltage before and after storage was 33 mV or more. When the relationship $[FSO_3^-]>[PO_2F_2^-]>[BOB^-]$ was satisfied and the storage temperature was 45° C. (when the storage temperature in Examples 2-1 to 2-4 is 45° C.), the initial output characteristic was lower than when the relationship $[FSO_3^-]>[PO_2F_2^-]>[BOB^-]$ was satisfied and the storage temperature was 60° C. (when the storage temperature in Examples 2-1 to 2-4 was 60° C.).

It can be seen that when the relationship $[FSO_3^-]>[PO_2F_2^-]>[BOB^-]$ was not satisfied (Comparative Examples 2-1 to 2-7), the initial output characteristic was lower regardless of the storage temperature compared to the case where the relationship $[FSO_3^-]>[PO_2F_2^-]>[BOB^-]$ was satisfied and the storage temperature was 60° C. (the storage temperature in Examples 2-1 to 2-4 was 60° C.). According to Examples 2-1 to 2-4 and Comparative Examples 2-1 to 2-7, it was found that when using a non-aqueous electrolytic solution in which the content of $FSO_3^-$, $PO_2F_2^-$, and $BOB^-$ were within a specific range and when the voltage change when stored under a high-temperature environment was 33 mV or higher, the output characteristics of the non-aqueous electrolytic solution secondary battery under a low-temperature environment were improved.

Examples 3-1 to 3-4, Comparative Examples 3-1 to 3-4

[Preparation of Negative Electrode]

Negative electrodes were prepared in the same manner as in Example 1-1.

[Preparation of Positive Electrode]

Positive electrodes were prepared in the same manner as in Example 1-1.

[Preparation of Non-Aqueous Electrolytic Solution]

A basic electrolytic solution 2 was prepared by diluting aluminum fluorosulfonate ($Al(FSO_3)_3$) with ethylene carbonate (EC), ethyl methyl carbonate (EMC), and dimethyl carbonate (DMC) under a dry argon atmosphere in such a manner that the concentration of Al ions in the solvent mixture was as shown in Table 3 based on Al $(FSO_3)_3$ and the composition of the solvents was 30:35:35 by volume ratio of EC, EMC, and DMC, and by dissolving sufficiently dried $LiPF_6$ at 1.1 mol/L (as the concentration in the non-aqueous electrolytic solution). To the basic electrolytic solution 2 made above, $FSO_3Li$, $LiPO_2F_2$, and LiBOB were added to prepare a non-aqueous electrolytic solution as described in Table 3 below. In parentheses in the table, the concentration of fluorosulfonic acid ion $[FSO_3^-]$, the concentration of difluorophosphate ion $[PO_2F_2^-]$, and the concentration of bisoxalate borate ion $[BOB^-]$ are shown.

In Table 3, regarding 0 ppm by mass of Al element (result without Al element), $FSO_3^-$, $PO_2F_2^-$, and $BOB^-$ were added to the above basic electrolytic solution 1 to prepare non-aqueous electrolytic solutions listed in Table 3 below. In Table 3, the contents of $FSO_3^-$, $PO_2F_2^-$, and $BOB^-$ indicate the amounts added, and the content of Al element (Al ion) is the value obtained based on the measurement results of inductively coupled radio frequency plasma atomic emission spectrometry (ICP-AES) as described below. The "content (% by mass)" and "content (ppm by mass)" in the table are the content when the basic electrolytic solution 1 was set to 100% by mass.

<Measurement of Al Element Content in Non-Aqueous Electrolytic Solution>

100 μL (about 130 mg) of non-aqueous electrolytic solution was aliquoted. The aliquoted non-aqueous electrolytic solution was weighed into a PTFE beaker, wet decomposed on a hot plate with an appropriate amount of concentrated nitric acid, and then weighed 50 mL to determine the content of Al elements using inductively coupled high frequency plasma atomic emission spectrometry (ICP-AES, Thermo Fischer Scientific, iCAP 7600duo) with Li and acid concentration matching calibration curve method.

[Manufacture of Non-Aqueous Electrolytic Solution Secondary Battery]

The above-described positive electrode, negative electrode, and a polyethylene separator were layered in the order of the negative electrode, the separator, and the positive electrode to prepare a battery element. This battery element was inserted into a bag made of laminated film coated with a resin layer on both sides of aluminum (40 μm thick) with the terminals of the positive and negative electrodes protruding, and then the non-aqueous electrolytic solution prepared as described above was injected into the bag and vacuum-sealed to prepare a laminated type non-aqueous electrolytic solution secondary battery.

[Battery Break-In Operation]

Battery break-in operation was performed in the same manner as in Example 1-1 and others. From the results of ion chromatography, it was confirmed that the composition of the non-aqueous electrolytic solution at the time of preparation satisfied formula (1) even after the aging process.

[Evaluation of Initial Output Characteristics]

The batteries that had completed evaluation of the battery break-in operation were charged at 25° C. to 3.72 V at a constant current of ⅙ C. The batteries were discharged at 0.5 C, 1.0 C, 1.5 C, 2.0 C, and 2.5 C at –20° C., respectively, and the voltage at 5 seconds was measured. Resistance value (Ω) was obtained from the slope of the current-voltage line. Table 3 shows the relative values (%) when the resistance value (reference resistance value) when 19 ppm by mass of Al element was contained in Example 3-1 was set to 100.0. In the present Example, from the viewpoint of practicality, the resistance value when aging was performed at 60° C. for 24 hours was considered acceptable if the resistance value was equal to or less than the reference resistance value.

TABLE 3

| | Composition of lithium salts (ions) in non-aqueous electrolytic solution | | | Initial Output Characteristics | |
|---|---|---|---|---|---|
| | [FSO₃Li] ([FSO₃⁻]) (% by mass) | [LiPO₂F₂] ([PO₂F₂⁻]) (% by mass) | [LiBOB] ([BOB⁻]) (% by mass) | Al element: 0 ppm by mass | Al element: 19 ppm by mass |
| Example 3-1 | 0.75(0.7) | 0.65(0.61) | 0.5(0.48) | 103.2 | 100 |
| Example 3-2 | 1.3(1.2) | 0.6(0.56) | 0.1(0.1) | 100.1 | 99 |
| Example 3-3 | 1.0(0.93) | 0.9(0.84) | 0.1(0.1) | 102.6 | 94.7 |
| Example 3-4 | 1.2(1.13) | 0.45(0.42) | 0.35(0.34) | 102.5 | 97.8 |
| Comparative Example 3-1 | 0.5(0.47) | 0.5(0.47) | 0.5(0.48) | 104.5 | 104.9 |
| Comparative Example 3-2 | 0.15(0.14) | 0.5(0.47) | 0.5(0.48) | 110.2 | 105.2 |
| Comparative Example 3-3 | 0.15(0.14) | 0.1(0.09) | 0.1(0.1) | 107.2 | 110.2 |
| Comparative Example 3-4 | 1.0(0.93) | 0.5(0.47) | 0.5(0.48) | 119.6 | 103.9 |

It is clear from Table 3 that when the relationship $[FSO_3^-]>[PO_2F_2^-]>[BOB^-]$ was satisfied and no Al ions were contained (0 ppm by mass of Al element in Examples 3-1 to 3-4), the initial output characteristics were lower than when the relationship $[FSO_3^-]>[PO_2F_2^-]>[BOB^-]$ was satisfied and 19 ppm Al element was contained (19 ppm by mass of element in Examples 3-1 to 3-4).

When the relationship $[FSO_3^-]>[PO_2F_2^-]>[BOB^-]$ was not satisfied (Comparative Examples 3-1 to 3-4), the initial output characteristics were lower regardless of the Al element content compared to when the relationship $[FSO_3^-]>[PO_2F_2^-]>[BOB^-]$ was satisfied and 19 ppm of Al element was contained (19 ppm by mass of element in Examples 3-1 to 3-4). From Examples 3-1 to 3-4 and Comparative Examples 3-1 to 3-4, it was shown that the output characteristics of a non-aqueous electrolytic solution secondary battery under a low-temperature environment can be further improved by using a non-aqueous electrolytic solution with $FSO_3^-$, $PO_2F_2^-$ and $BOB^-$ contents within a specific range and by the electrolytic solution containing a specified amount of Al ions.

INDUSTRIAL APPLICABILITY

According to the non-aqueous electrolytic solution of the present invention, manufacturing of a non-aqueous electrolytic solution secondary battery that can improve low-temperature output characteristics and a non-aqueous electrolytic solution secondary battery can be realized, which is useful. Therefore, the non-aqueous electrolytic solution of the embodiment of the present invention and an energy devise such as a non-aqueous electrolytic solution secondary battery using the solution can be used for a variety of known applications. Examples of applications include a laptop computer, a pen input computer, a mobile computer, an e-book player, a cellular phone, a portable fax machine, a portable copy machine, a portable printer, a headphone stereo, a video movie, an LCD TV, a handy cleaner, a portable CD, a mini disk, a walkie-talkie, an electronic organizer, a calculator, a memory card, a portable tape recorder, a radio, a backup power supply, a motor, a car, a motorcycle, a motorized bicycle, a bicycle, a lighting device, a toy, a game device, a watch, a power tool, a strobe, a camera, a backup power supply for household use, a backup power supply for business use, a power supply for load leveling, a natural energy storage power supply, and a lithium-ion capacitor.

What is claimed is:

1. A non-aqueous electrolytic solution secondary battery comprising a non-aqueous electrolytic solution containing fluorosulfonic acid ions, difluorophosphate ions, and bisoxalate borate ions, wherein the non-aqueous electrolytic solution is a non-aqueous electrolytic solution in which the concentration of fluorosulfonic acid ions $[FSO_3^-]$, the concentration of difluorophosphate ions $[PO_2F_2^-]$, and the concentration of bisoxalate borate ions $[BOB^-]$ in the non-aqueous electrolytic solution satisfy the following formula (1).

$$[FSO_3^-]>[PO_2F_2^-]>[BOB^-] \quad (1)$$

2. The non-aqueous electrolytic solution secondary battery according to claim 1, wherein the non-aqueous electrolytic solution is a non-aqueous electrolytic solution that satisfies the following formula (2) and formula (3).

$$([FSO_3^-]+[PO_2F_2^-])/([PO_2F_2^-]+[BOB^-])>1.8 \quad (2)$$

$$[FSO_3^-]<1.3\% \text{ by mass} \quad (3)$$

3. The non-aqueous electrolytic solution secondary battery according to claim 1, wherein the voltage change is 33 mV or more when the non-aqueous electrolytic solution secondary battery is stored for 24 hours at a voltage of 4.1 V and a high-temperature environment of 60° C. or higher.

4. The non-aqueous electrolytic solution secondary battery according to claim 1, wherein the non-aqueous electrolytic solution contains 1 ppm by mass or more and 100 ppm by mass or less of Al ions.

5. The non-aqueous electrolytic solution secondary battery according to claim 1, containing a negative electrode and a positive electrode capable of absorbing and releasing lithium ions.

6. The non-aqueous electrolytic solution secondary battery according to claim 5, wherein the positive electrode includes a current collector and a positive electrode active material layer provided on the current collector, and the positive electrode active material layer contains at least one selected from the group consisting of lithium-cobalt composite oxide, lithium-cobalt-nickel composite oxide, lithium-manganese composite oxide, lithium-cobalt-manganese composite oxide, lithium-nickel composite oxide, lithium-nickel-manganese composite oxide, and lithium-cobalt-nickel-manganese composite oxide.

7. A method of manufacturing a non-aqueous electrolytic solution secondary battery comprising a non-aqueous electrolytic solution containing fluorosulfonic acid ions, difluorophosphate ions, and bisoxalate borate ions, the method comprising:

a battery assembly process of assembling a non-aqueous electrolytic solution secondary battery using a non-aqueous electrolytic solution in which the concentration of fluorosulfonic acid ions $[FSO_3^-]$, the concentration of difluorophosphate ions $[PO_2F_2^-]$, and the concentration of bisoxalate borate ions $[BOB^-]$ in the non-aqueous electrolytic solution satisfy the following formula (1); and an aging process of aging the non-aqueous electrolytic solution secondary battery under a temperature environment in a range of 50° C. or more and 80° C. or less.

$$[FSO_3^-]>[PO_2F_2^-]>[BOB^-] \quad (1)$$

* * * * *